US009955385B2

(12) United States Patent
Rico Alvarino et al.

(10) Patent No.: US 9,955,385 B2
(45) Date of Patent: Apr. 24, 2018

(54) BUNDLE SIZE DETERMINATION FOR NARROWBAND COMMUNICATION

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 15/216,442

(22) Filed: Jul. 21, 2016

(65) Prior Publication Data
US 2017/0034740 A1 Feb. 2, 2017

Related U.S. Application Data

(60) Provisional application No. 62/199,799, filed on Jul. 31, 2015, provisional application No. 62/222,686, filed on Sep. 23, 2015.

(51) Int. Cl.
*H04W 28/24* (2009.01)
*H04W 72/04* (2009.01)
*H04W 4/00* (2018.01)
*H04L 1/00* (2006.01)
*H04L 1/08* (2006.01)

(52) U.S. Cl.
CPC .......... *H04W 28/24* (2013.01); *H04L 1/0046* (2013.01); *H04L 1/0072* (2013.01); *H04L 1/08* (2013.01); *H04W 4/005* (2013.01); *H04W 72/04* (2013.01)

(58) Field of Classification Search
None
See application file for complete search history.

(56) References Cited

U.S. PATENT DOCUMENTS

| 2014/0044056 | A1* | 2/2014 | Chen | H04W 72/04 370/329 |
| 2015/0039958 | A1* | 2/2015 | Vos | H04L 1/1819 714/748 |
| 2015/0181576 | A1 | 6/2015 | Papasakellariou et al. | |
| 2015/0257173 | A1* | 9/2015 | You | H04L 1/1864 370/330 |

(Continued)

FOREIGN PATENT DOCUMENTS

WO WO-2015072774 A1 5/2015

OTHER PUBLICATIONS

ISA/EP, International Search Report and Written Opinion of the International Searching Authority, Int'l Application No. PCT/US2016/043694, dated Oct. 19, 2016, European Patent Office, Rijswijk, NL, 14 pgs.

*Primary Examiner* — Eunsook Choi
(74) *Attorney, Agent, or Firm* — Holland & Hart LLP

(57) ABSTRACT

Coverage enhancement (CE) levels by Machine Type Communication (MTC) devices may identify a first bundling level indicating a number of redundant versions of information to be transmitted to a receiver in a control channel transmission. The CE levels may also identify a second bundling level indicating a number of redundant versions of information to be transmitted to the receiver in a shared channel transmission. The CE levels may also set an indicator in a control information field to indicate the second bundling level based on the first bundling level and the second bundling level.

30 Claims, 23 Drawing Sheets

(56) References Cited

U.S. PATENT DOCUMENTS

| | | | |
|---|---|---|---|
| 2015/0296518 A1* | 10/2015 | Yi | H04L 1/08 370/336 |
| 2016/0174259 A1* | 6/2016 | Mukherjee | H04L 1/1816 370/280 |
| 2017/0164350 A1* | 6/2017 | Sun | H04W 72/0413 |
| 2017/0215172 A1* | 7/2017 | Yang | H04W 72/042 |

* cited by examiner

BUNDLE SIZE DETERMINATION FOR NARROWBAND COMMUNICATION

CROSS REFERENCES

The present application for patent claims priority to U.S. Provisional Patent Application No. 62/199,799 by Rico Alvarino et al., entitled "Bundle Size Determination for Narrowband Communication," filed Jul. 31, 2015; and U.S. Provisional Patent Application No. 62/222,686 by Rico Alvarino et al., entitled "Bundle Size Determination for Narrowband Communication," filed Sep. 23, 2015; each of which is assigned to the assignee hereof.

BACKGROUND

The following relates generally to wireless communication, and more specifically to bundle size determination for narrowband communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some types of wireless devices may provide for automated communication. Automated wireless devices may include those implementing Machine-to-Machine (M2M) communication or Machine Type Communication (MTC). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application.

MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some wireless communications systems may employ coverage enhancement (CE) techniques that increase system robustness. There may be different levels of CE such that higher level CE provide more reliable communications with respect to lower level CE. Coverage enhancements may include, for example, power boosting (e.g., of up to 15 dB), beam-forming, and bundling of transmit time intervals (TTIs) to provide redundant versions of a transmission. Efficient techniques for indicating and determination of CE levels, such as bundling levels, may enhance the overall efficiency of MTC devices.

SUMMARY

The described features generally relate to methods, systems, and devices for coverage enhancement (CE) level determination by Machine Type Communication (MTC) devices. In various examples, a CE level indicator may be provided in a control channel transmission and the CE level indicator, coupled with the CE level of the control channel transmission itself, may be mapped to a CE level for a subsequent shared channel transmission. CE level determination may be determined by a wireless device (e.g., an MTC device) through a scrambling sequence used to scramble a portion of a transmission. The particular scrambling sequence used to scramble the transmission may be mapped to a CE level, such as a bundling level, associated with the transmission. A transmitting MTC device may select a CE level, and transmit using the scrambling sequence associated with the selected CE level. A receiving MTC device may iteratively descramble the transmission, and determine the CE level based at least in part on the scrambling sequence that was successful in descrambling the transmission. The CE level may, in some examples, be mapped to a hopping pattern.

A method of wireless communication is described. The method may include identifying information to be transmitted to a receiver, identifying a bundling level indicating a number of redundant versions of the information to be transmitted, selecting, based at least in part on the bundling level, a scrambling sequence for scrambling the information prior to transmission of the information, and scrambling the information based at least in part on the selected scrambling sequence.

An apparatus for wireless communication is described. The apparatus may include means for identifying information to be transmitted to a receiver, means for identifying a bundling level indicating a number of redundant versions of the information to be transmitted, means for selecting, based at least in part on the bundling level, a scrambling sequence for scrambling the information prior to transmission of the information, and means for scrambling the information based at least in part on the selected scrambling sequence.

A further apparatus for wireless communication is described. The apparatus may include a processor, memory in electronic communication with the processor, and instructions stored in the memory and operable, when executed by the processor, to cause the apparatus to identify information to be transmitted to a receiver, identify a bundling level indicating a number of redundant versions of the information to be transmitted, select, based at least in part on the bundling level, a scrambling sequence for scrambling the information prior to transmission of the information, and scramble the information based at least in part on the selected scrambling sequence.

A non-transitory computer-readable medium storing code for wireless communication is described. The code may include instructions executable to identify information to be transmitted to a receiver, identify a bundling level indicating a number of redundant versions of the information to be transmitted, select, based at least in part on the bundling level, a scrambling sequence for scrambling the information prior to transmission of the information, and scramble the information based at least in part on the selected scrambling sequence.

Some examples of the method, apparatuses, or non-transitory computer-readable medium described herein may further include processes, features, means, or instructions for coding the scrambled information according to a coding scheme, and transmitting the coded and scrambled information to the receiver. Additionally or alternatively, in some examples the information may include data and a cyclic redundancy check (CRC) associated with the data, and the scrambling the information may include scrambling the cyclic redundancy check (CRC) using the selected scrambling sequence.

Some examples of the method, apparatuses, or non-transitory computer-readable medium described herein may further include processes, features, means, or instructions for selecting, based at least in part on the bundling level, a hopping sequence for selecting frequency sub-bands for transmission of portions of the information. In some examples, the hopping sequence may be selected based at least in part on a lowest bundling level of information to be transmitted to the receiver.

In some examples of the method, apparatuses, or non-transitory computer-readable medium described herein, the CRC is scrambled with a radio network temporary identifier (RNTI) and one or more bits that indicate the bundling level. Additionally or alternatively, in some examples the information may include data and a cyclic redundancy check (CRC) associated with the data, and the scrambling the information may include scrambling the data and the CRC using the selected scrambling sequence.

In some examples of the method, apparatuses, or non-transitory computer-readable medium described herein, the scrambling sequence may further selected based at least in part on a radio network temporary identifier (RNTI) of the receiver. Additionally or alternatively, in some examples the selecting the scrambling sequence may include selecting an interleaving sequence, from a plurality of available interleaving sequences, for interleaving the data, and scrambling the information may include interleaving the information using the selected interleaving sequence.

In some examples of the method, apparatuses, or non-transitory computer-readable medium described herein, the information may include downlink control information (DCI) transmitted over a control channel.

A method of wireless communication is described. The method may include identifying a plurality of available bundling levels indicating a number of redundant versions of information included in a first transmission, identifying a plurality of scrambling sequences for descrambling the first transmission, each of the plurality of scrambling sequences associated with one of the available bundling levels, descrambling at least a portion of the first transmission using a first scrambling sequence of the identified scrambling sequences, and determining the bundling level used for the first transmission based at least in part on successful descrambling of at least the portion of the first transmission using the first scrambling sequence.

An apparatus for wireless communication is described. The apparatus may include means for identifying a plurality of available bundling levels indicating a number of redundant versions of information included in a first transmission, means for identifying a plurality of scrambling sequences for descrambling the first transmission, each of the plurality of scrambling sequences associated with one of the available bundling levels, means for descrambling at least a portion of the first transmission using a first scrambling sequence of the identified scrambling sequences, and means for determining the bundling level used for the first transmission based at least in part on successful descrambling of at least the portion of the first transmission using the first scrambling sequence.

A further apparatus for wireless communication is described. The apparatus may include a processor, memory in electronic communication with the processor, and instructions stored in the memory and operable, when executed by the processor, to cause the apparatus to identify a plurality of available bundling levels indicating a number of redundant versions of information included in a first transmission, identify a plurality of scrambling sequences for descrambling the first transmission, each of the plurality of scrambling sequences associated with one of the available bundling levels, descramble at least a portion of the first transmission using a first scrambling sequence of the identified scrambling sequences, and determine the bundling level used for the first transmission based at least in part on successful descrambling of at least the portion of the first transmission using the first scrambling sequence.

A non-transitory computer-readable medium storing code for wireless communication is described. The code may include instructions executable to identify a plurality of available bundling levels indicating a number of redundant versions of information included in a first transmission, identify a plurality of scrambling sequences for descrambling the first transmission, each of the plurality of scrambling sequences associated with one of the available bundling levels, descramble at least a portion of the first transmission using a first scrambling sequence of the identified scrambling sequences, and determine the bundling level used for the first transmission based at least in part on successful descrambling of at least the portion of the first transmission using the first scrambling sequence.

Some examples of the method, apparatuses, or non-transitory computer-readable medium described herein may further include processes, features, means, or instructions for decoding the portion of the descrambled first transmission using one or more available decoding schemes, the portion of the descrambled first transmission including a first redundant version of the information included in the first transmission; determining if the information is successfully decoded; and determining whether to terminate reception of the first transmission based at least in part on the information being successfully decoded. Additionally or alternatively, in some examples determining whether to terminate the reception of the first transmission may include determining, based at least in part on the bundling level, that multiple redundant versions of the information are included in the first transmission, and terminating reception of the first transmission when the information is successfully decoded prior to the reception of the entire first transmission.

Some examples of the method, apparatuses, or non-transitory computer-readable medium described herein may further include processes, features, means, or instructions for determining if the information is successfully decoded is based at least in part on a cyclic redundancy check (CRC). Additionally or alternatively, some examples may include processes, features, means, or instructions for determining that the first scrambling sequence was unsuccessful in descrambling at least the portion of the first transmission, iteratively attempting to descramble at least the portion of the first transmission using other of the plurality of scrambling sequences, and determining the bundling level used for the first transmission based at least in part on which of the other of the plurality of scrambling sequences was successful in descrambling of at least the portion of the first transmission.

Some examples of the method, apparatuses, or non-transitory computer-readable medium described herein may further include processes, features, means, or instructions for identifying a plurality of hopping sequences for selecting frequency sub-bands for portions of the first transmission, each of the plurality of hopping sequences associated with one of the available bundling levels; and determining a first hopping sequence used for the first transmission based at least in part on the plurality of available bundling levels. In some examples, the first hopping sequence is selected based at least in part on a lowest bundling level of the plurality of available bundling levels.

In some examples of the method, apparatuses, or non-transitory computer-readable medium described herein, the information may include data and a cyclic redundancy check (CRC) associated with the data, and wherein descrambling the portion of the first transmission may include descrambling the CRC using the first scrambling sequence. Additionally or alternatively, in some examples the CRC is scrambled with a radio network temporary identifier (RNTI) and one or more bits that indicate the bundling level.

In some examples of the method, apparatuses, or non-transitory computer-readable medium described herein, the information may include data and a cyclic redundancy check (CRC) associated with the data, and descrambling the portion of the first transmission may include descrambling the data and the CRC using the first scrambling sequence. Additionally or alternatively, in some examples the first scrambling sequence is based at least in part on a radio network temporary identifier (RNTI) of a receiver of the received transmission.

Some examples of the method, apparatuses, or non-transitory computer-readable medium described herein may further include processes, features, means, or instructions for descrambling the portion of the first transmission by deinterleaving the first transmission according to a first interleaving sequence of a plurality of available interleaving sequences, and determining the bundling level used for the first transmission is based at least in part on the first interleaving sequence. Additionally or alternatively, in some examples the information may include downlink control information (DCI) transmitted over a control channel.

A method of wireless communication is described. The method may include identifying a first bundling level indicating a number of redundant versions of information to be transmitted to a receiver in a control channel transmission, identifying a second bundling level indicating a number of redundant versions of information to be transmitted to the receiver in a shared channel transmission, and setting an indicator in a control information field to indicate the second bundling level based at least in part on the first bundling level and the second bundling level.

An apparatus for wireless communication is described. The apparatus may include means for identifying a first bundling level indicating a number of redundant versions of information to be transmitted to a receiver in a control channel transmission, means for identifying a second bundling level indicating a number of redundant versions of information to be transmitted to the receiver in a shared channel transmission, and means for setting an indicator in a control information field to indicate the second bundling level based at least in part on the first bundling level and the second bundling level.

A further apparatus for wireless communication is described. The apparatus may include a processor, memory in electronic communication with the processor, and instructions stored in the memory and operable, when executed by the processor, to cause the apparatus to identify a first bundling level indicating a number of redundant versions of information to be transmitted to a receiver in a control channel transmission, identify a second bundling level indicating a number of redundant versions of information to be transmitted to the receiver in a shared channel transmission, and set an indicator in a control information field to indicate the second bundling level based at least in part on the first bundling level and the second bundling level.

A non-transitory computer-readable medium storing code for wireless communication is described. The code may include instructions executable to identify a first bundling level indicating a number of redundant versions of information to be transmitted to a receiver in a control channel transmission, identify a second bundling level indicating a number of redundant versions of information to be transmitted to the receiver in a shared channel transmission, and set an indicator in a control information field to indicate the second bundling level based at least in part on the first bundling level and the second bundling level.

In some examples of the method, apparatuses, or non-transitory computer-readable medium described herein, the setting the indicator is further based at least in part on a mapping between the second bundling level, the first bundling level, and information contained in the indicator. Additionally or alternatively, in some examples the mapping is transmitted to the receiver prior to the control channel transmission. In some examples, the mapping is transmitted in one or more of a system information block (SIB) or radio resource control (RRC) configuration information. Additionally or alternatively, in some examples the mapping is established in a specification for wireless communication.

In some examples of the method, apparatuses, or non-transitory computer-readable medium described herein, the control information field is an information field included in downlink control information (DCI) provided to the receiver.

A method of wireless communication is described. The method may include receiving an indicator in a control information field to indicate bundling levels for transmissions to be received in one or more shared channel transmissions, the bundling levels indicating a number of redundant versions of information to be included in the one or more shared channel transmissions, determining a first bundling level of a received control channel transmission, and determining a second bundling level of a first shared channel transmission based at least in part on the first bundling level and the indicator.

An apparatus for wireless communication is described. The apparatus may include means for receiving an indicator in a control information field to indicate bundling levels for transmissions to be received in one or more shared channel transmissions, the bundling levels indicating a number of redundant versions of information to be included in the one or more shared channel transmissions, means for determining a first bundling level of a received control channel transmission, and means for determining a second bundling level of a first shared channel transmission based at least in part on the first bundling level and the indicator.

A further apparatus for wireless communication is described. The apparatus may include a processor, memory in electronic communication with the processor, and instructions stored in the memory and operable, when executed by the processor, to cause the apparatus to receive an indicator in a control information field to indicate bundling levels for transmissions to be received in one or more shared channel transmissions, the bundling levels indicating a number of redundant versions of information to be included in the one or more shared channel transmissions, determine a first bundling level of a received control channel transmission, and determine a second bundling level of a first shared channel transmission based at least in part on the first bundling level and the indicator.

A non-transitory computer-readable medium storing code for wireless communication is described. The code may include instructions executable to receive an indicator in a control information field to indicate bundling levels for transmissions to be received in one or more shared channel transmissions, the bundling levels indicating a number of redundant versions of information to be included in the one or more shared channel transmissions, determine a first bundling level of a received control channel transmission, and determine a second bundling level of a first shared channel transmission based at least in part on the first bundling level and the indicator.

In some examples of the method, apparatuses, or non-transitory computer-readable medium described herein, the determining the second bundling level is further based at least in part on a mapping between the second bundling level, the first bundling level, and information contained in the indicator. Additionally or alternatively, in some examples the mapping is received prior to the control channel transmission.

In some examples of the method, apparatuses, or non-transitory computer-readable medium described herein, the mapping is received in one or more of a system information block (SIB) or radio resource control (RRC) configuration information. Additionally or alternatively, in some examples the mapping is established in a specification for wireless communication.

In some examples of the method, apparatuses, or non-transitory computer-readable medium described herein, the control information field is an information field received in downlink control information (DCI) from a transmitter.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

Aspects of the disclosure are described in reference to the following figures.

DETAILED DESCRIPTION

Figure 1:
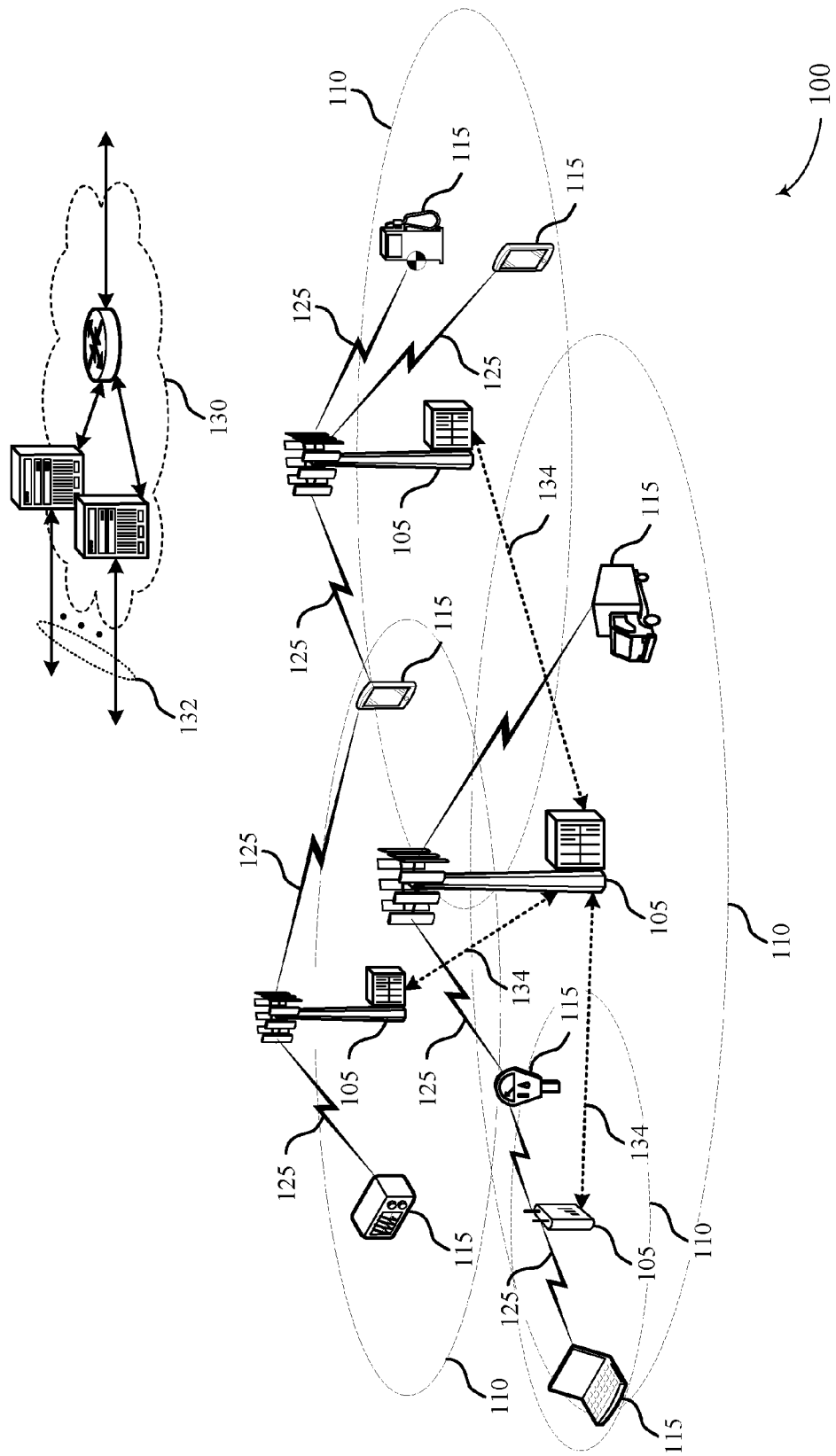
FIG. 1 illustrates an example of a wireless communications system that supports bundle size determination for narrowband communication in accordance with various aspects of the present disclosure.

Accurate determination and signaling of a wireless device's (e.g., a Machine Type Communication (MTC) device) coverage enhancement (CE) may increase system robustness and may increase longevity and performance of wireless devices in a wireless communications network. CE may be a function of or may be associated with a particular device's radio link conditions, which in turn may be associated with, for example, the physical location of the device. A wireless system may implement CE techniques to improve the likelihood of successful communications with wireless devices. In some cases, a wireless system may support different CE levels (also referred to as coverage extensions), each of which may provide a different amount of CE. In examples of the disclosure, a scrambling sequence used to scramble the transmission may be mapped to a CE level, such as a bundling level, associated with the transmission. The CE level may, in some examples, be mapped to a hopping pattern of frequency sub-bands used for transmission of different portions of the transmission.

As noted above, various aspects of the present disclosure provide for signaling and determination of bundling levels in a wireless communications system. For example, a user equipment (UE), such as an MTC device for example, may identify a set of available bundling levels indicating a number of redundant versions of information included in a transmission. Based on the set of available bundling levels, the UE may identify a frequency hopping sequence for the transmission. The UE also may identify a set of scrambling sequences for descrambling the transmission, each sequence of the set of scrambling sequences associated with one of the available bundling levels. The UE may descramble a first portion of the transmission iteratively, using successive sequences of the set of scrambling sequences, and may determine the bundling level used for the transmission based on which scrambling sequence successfully descrambled the portion of the transmission. In some examples, the UE may then determine if information in the transmission has been successfully decoded, in which case the UE may perform an early termination of the reception of the transmission and thus conserve resources.

As mentioned, the transmission may be a control channel transmission, and may include downlink control information (DCI), which may include an indicator of a bundling level to be used in a subsequent shared channel transmission. In some examples, the bundling level used for a control channel transmission may be different than the bundling level used in a shared channel transmission, although in other examples both the control channel and shared channel transmissions may have a same bundling level (but may differ on other CE techniques). The indicator in the control channel information, along with a bundling level of the control channel transmission, may be mapped to a bundling level for the shared channel transmission. In some examples, the hopping sequence for the transmission may be based on the lowest bundling level associated with the shared channel transmission or the control channel transmission (e.g., based on a lowest configured bundling level of the UE).

Coverage enhancements may include, for example, power boosting (e.g., of up to 15 dB), beam-forming, and bundling of transmit time intervals (TTIs) to provide redundant versions of a transmission. Wireless communications system may, for example, employ TTI bundling to improve a communication link in relatively poor radio conditions or in deployments where wireless devices may operate using a relatively narrow bandwidth or are in a coverage limited locations, such as a basement. TTI bundling may involve sending multiple redundant copies of the same information in a group of consecutive or non-consecutive TTIs rather than waiting for feedback indicating data was not received before retransmitting redundancy versions. For instance, various physical channels—including control channels and associated messages—may be associated with multiple redundant transmissions to a wireless communications device. In some cases, the number of redundant versions can be on the order of tens of subframes; and different channels may have different redundancy levels.

The following description further explains the above-discussed aspects and provides additional examples; the description is not, however, limiting of the scope, applicability, or examples set forth in the claims. Changes may be made in the function and arrangement of elements discussed without departing from the scope of the disclosure. Various examples may omit, substitute, or add various procedures or components as appropriate. For example, although the scenarios are described with respect to MTC devices, the techniques described herein may be used with a variety of other type wireless communications devices and systems. In addition, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-advanced (LTE-a) network. A UE 115 may be an MTC device, which may determine CE levels by determining a scrambling sequence used in a transmission received from a base station 105, for example.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Some types of wireless devices may provide for automated communication, as briefly discussed above. Automated wireless devices may include those implementing Machine-to-Machine (M2M) communication or Machine Type Communication (MTC). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

In some cases, as mentioned above, wireless communication system 100 may utilize CE techniques to improve the quality of a communications link 125 for UEs 115 located at a cell edge, operating with low power transceivers, or experiencing high interference or path loss. CE techniques may include repeated transmissions, transmission time interval (TTI) bundling, hybrid automatic repeat request (HARQ) retransmission, physical uplink shared channel (PUSCH) hopping, beamforming, power boosting, or other techniques. The CE techniques used may depend on the specific needs of UEs 115 in different circumstances. For example, TTI bundling may involve sending multiple copies of the same information in a group of consecutive TTIs rather than waiting for a negative acknowledgement (NACK) before retransmitting redundancy versions. This may be effective for users engaging in voice over Long Term evolution (VoLTE) or VOIP communications, for example. In other cases, the number of HARQ retransmissions may also be increased. Uplink data transmissions may be transmitted using frequency hopping to achieve frequency diversity. Beamforming may be used to increase the strength of a signal in a particular direction, or the transmission power may simply be increased. In some cases, one or more CE options may be combined and CE levels may be defined based on a number of decibels the techniques are expected to improve a signal (e.g., no CE, 5 dB CE, 10 dB CE, 15 dB CE, etc.).

In some examples, bundling levels for a transmission may be determined by a UE 115 through identification of a scrambling sequence used to scramble at least a portion of a transmission. A base station 105, for example, may identify a bundling level for a transmission, and select a scrambling sequence for the transmission based at least in part on the bundling level. The UE 115 may iteratively descramble the transmission, and determine the bundling level based on the scrambling sequence that was successful in descrambling the transmission. In various examples, a bundling level indicator may be provided in a control channel transmission and the bundling level indicator, coupled with the bundling level of the control channel transmission itself, may be mapped to a bundling level for a subsequent shared channel transmission. In some examples, a frequency hopping sequence of a set of frequency hopping sequences may be associated with one of the available bundling levels, and the UE 115 may determine the hopping sequence used for a particular transmission based at least in part on the bundling level of the transmission. In some examples, the hopping sequence may be selected based on a lowest bundling level associated with the transmission.

Figure 2:
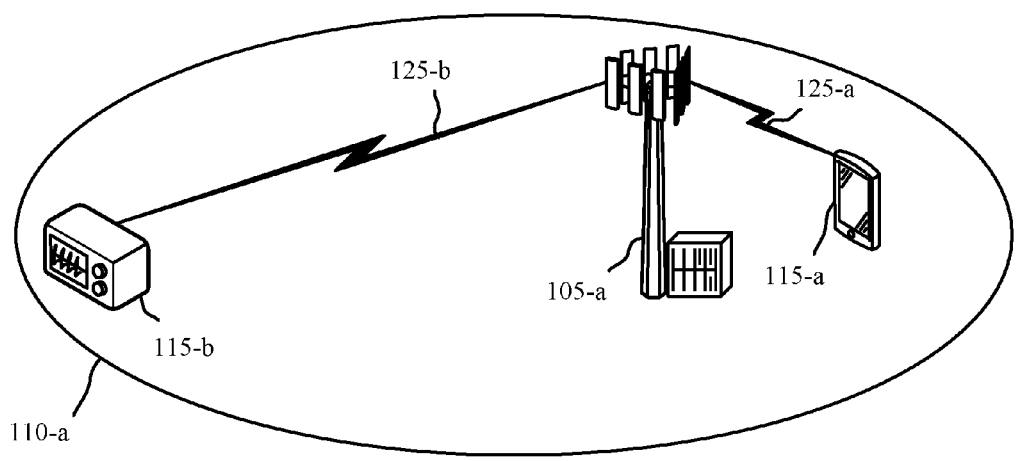
FIG. 2 illustrates an example of a wireless communications subsystem that supports bundle size determination for narrowband communication in accordance with various aspects of the present disclosure.

FIG. 2 illustrates an example of a wireless communications subsystem 200 for bundle size determination for narrowband communication in accordance with various aspects of the present disclosure. The wireless communication system 200 includes a base station 105-a, a first UE 115-a, and a second UE 115-b. The base station 105-a, the first UE 115-a, and the second UE 115-b may be examples of aspects of the base stations 105 or UEs 115 described with reference to FIG. 1.

In some examples, the base station 105-a may transmit a MTC physical downlink control channel (MPDCCH) transmission, which may be transmitted using one or more CE techniques such as TTI bundling, using communication links 125. For example, base station 105-a may transmit a first transmission to UE 115-a via communication link 125-a using a first bundling level, and may transmit a second transmission to UE 115-b via communication link 125-b using a second bundling level. Each UE 115 may monitors a set of aggregation levels and bundling, or repetition, levels. Aggregation levels may correspond to a number of resource elements (REs) that are monitored within a particular subframe, and in some examples UEs 115 may monitor a same aggregation level for different bundling levels. For example, first UE 115-a may monitor aggregation level 6 (i.e., 6 RBs per subframe) for repetition levels 4 and 8, and second UE 115-b may monitor aggregation level 4 (i.e., 4 RBs per subframe) for repetition levels 8 and 12.

As mentioned above, in order to conserve resources, UEs 115 may attempt to decode transmissions in less than the complete number of repetitions, which may allow a UE 115 to terminate the reception of a signal earlier than the full amount of time for reception of all of the repetitions of the received signal. For example, if a signal is transmitted by the base station 105-a with a repetition level of two to the first UE 115-a, and the first UE 115-a is able to successfully receive and decode the transmission after only the first repetition, the first UE 115-a may terminate the receive process, turn of a receiver at the UE 115-a, process the received signal, and potentially transition to a sleep state more quickly than if all of the repetitions are received, thus helping first UE 115-a to conserve resources.

Figure 3:
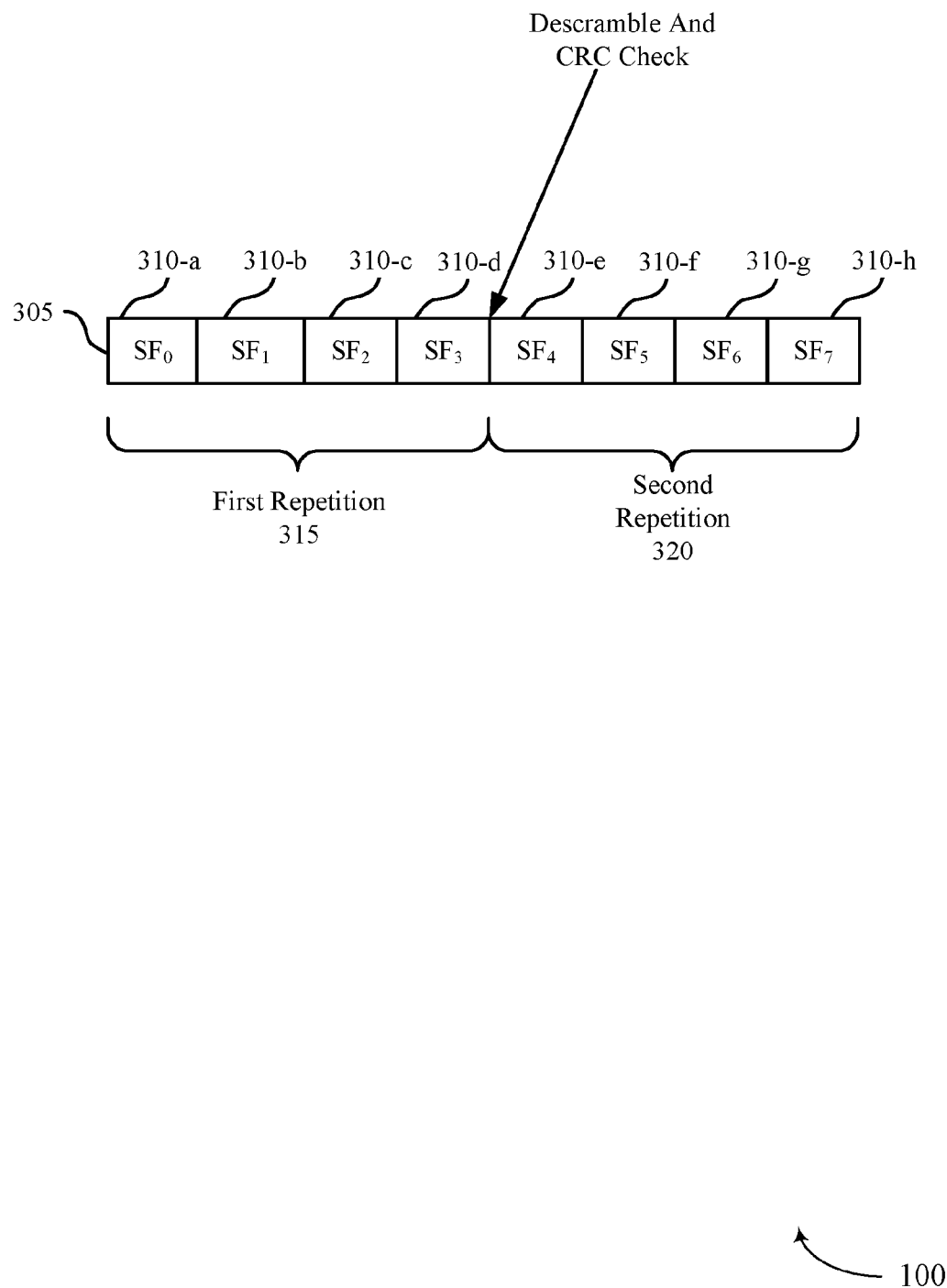
FIG. 3 illustrates an example of a transmission having redundant transmissions that supports bundle size determination for narrowband communication in accordance with various aspects of the present disclosure.

FIG. 3 illustrates an example 300 of a transmission 305 that may provide for bundle size determination in accordance with various aspects of the present disclosure. Transmission 305 may be transmitted between a base station and a UE, which may be examples of a UE 115 and base station 105 described with reference to FIGS. 1-2.

In the example of FIG. 3, transmission 305, which may be a MPDCCH transmission, may include eight subframes 310-a through 310-h, and have a bundling level of two. In this example, the first four subframes, $SF_0$ 310-a through $SF_3$ 310-d may transmit the first repetition 315, and the second four subframes, $SF_4$ 310-e through $SF_7$ 310-h may transmit the second repetition 320. It is to be noted that the number of repetitions and number of subframes 310 are provided for purposes of illustration and discussion only, and that techniques as discussed herein also apply to other numbers of subframes and repetitions. Following completion of the first repetition at $SF_3$ 310-a (or following N number of repetitions), a UE may descramble and CRC check the first repetition 315 to determine if the first repetition 315 is successfully received.

However, in cases where the transmission is a MPDCCH transmission, the UE may not have been previously signaled with a specific bundling level at which the MPDCCH transmission is to be transmitted. Furthermore, the timing for subsequent shared channel transmissions, such as physical downlink shared channel (PDSCH) transmissions, may be based on the completion of the MPDCCH transmission. Thus, with reference to both FIG. 2 and FIG. 3, if the first UE 115-a successfully performs blind decoding following the first repetition 315, the first UE 115-a may not know if it decoded all of the repetitions of transmission 305, or successfully early decoded a transmission in fewer than all of the repetitions. Furthermore, the UE 115-a may rely on MPDCCH duration information to determine timing for uplink or downlink assignment. For example, if the true bundle size for transmission 305 is 2, the UE 115-a may wait until the two MPDCCH transmission repetitions are completed to receive the subsequent PDSCH transmission. Thus, according to some examples, it may be desirable for UEs 115 to be able to determine the bundling level of a control channel transmission 305, and be able to early-terminate a reception operation if the signal is successfully received and decoded in fewer than all of the transmitted repetitions. Furthermore, it would be desirable to make these determinations using relatively few blind decodings and without increasing the payload length or amount of signaling required for transmissions.

According to some examples, UEs 115 may determine the bundling level of a control channel transmission, and perform early termination, through determination of a bundling level that is provided through a scrambling sequence. In some examples, the number of MPDCCH repetitions is included in a scrambled cyclic redundancy check (CRC) that is provided with a control channel transmission. In some examples, a CRC may be scrambled by a radio network temporary identifier (RNTI), which may be used by a UE 115 to determine that the transmission is directed to the UE 115. The CRC, in addition to being scrambled by the RNTI may also be scrambled with a bundle indication. For example, a 14-bit RNTI and a 2-bit bundle indication may be used as a scrambling sequence for control channel transmissions to a UE 115. In such examples, four different repetition levels may be configured by the base station 105-*a* (e.g., through radio resource control (RRC) signaling or through system information block (SIB) transmissions), and the UEs 115 may perform four CRC checks per decode. Based on the scrambling sequence to at results in a successful CRC decoding, a UE 115 may determine the bundling level of the transmission.

Using such techniques, enabling early termination does not require UE 115 hardware to perform additional decodings or CRC checks, but only changes the behavior of CRC checking. In some examples, for broadcast traffic (e.g. paging), a UE 115 may only monitor one repetition level. In some examples, a base station 105-*a* may determine that using a 14-bit RNTI does not provide a sufficient number of RNTIs for all of the UEs 115 to be supported, and that a 16-bit RNTI is needed. In such cases, the base station 105-*a* may reduce the number of bundling levels (e.g., to two bundling levels that may be signaled in one bit), or disable early termination by UEs 115 entirely, in order to provide additional bits that may be used for RNTI. In other examples, if reserving some RNTIs is not practical (e.g. when a relatively large number of UEs are in sleep mode, each one with the corresponding RNTI), other scrambling sequence techniques may be used to differentiate the bundle size. In some examples, a scrambling may be introduced before coding of the data to be included in a transmission, allowing the CRC to be scrambled with the maximum number of configured bits. Such a scrambling sequence can depend on the RNTI as well, in some examples. In other examples, an interleaver may be introduced before coding, with an interleaving sequence corresponding to a bundling level. In each of these examples, the scrambling sequence is applied before coding of the data to be transmitted, such that no additional blind decodings are needed in order to enable early termination.

As mentioned above, following a control channel transmission, such as a MPDCCH transmission, a shared channel transmission, such as a PDSCH transmission, may be transmitted. In some examples, the control channel transmission may include downlink control information (DCI) which may include an indicator of a bundling level to be used for the subsequent shared channel transmission. For a UE 115 with time-varying conditions, it may be useful to monitor a larger MPDCCH bundling level than needed, in case the channel conditions worsen. For example, if initial channel conditions indicate a MPDCCH bundle size of two, a UE 115 may also monitor a bundle size of four. If the UE 115 moves to a worse channel condition, the base station 105-*a* may use the higher repetition level, which may also imply that the associated shared channel transmission might also need a higher repetition level. According to some examples, the control channel bundle size, which is detected by blind decoding, and/or the control channel aggregation level, may be tied with the shared channel bundle size. For example, first UE 115-*a* may be configured to monitor control channel transmissions for repetition levels two and four, and a one-bit indicator transmitted in the control channel transmission may be used to determine shared channel bundling levels as follows:

MPDCCH with repetition level 2: 0=bundle size 10. 1=bundle size 20;

MPDCCH with repetition level 4: 0=bundle size 20; 1=bundle size 40.

In some examples, this mapping may be provided through some higher layer signaling, such as SIB transmissions or RRC configuration. For example, base station 105-*a* may indicate the mapping to UEs 115 via RRC to provide the relationship between MPDCCH and PDSCH bundle sizes.

Figure 4:
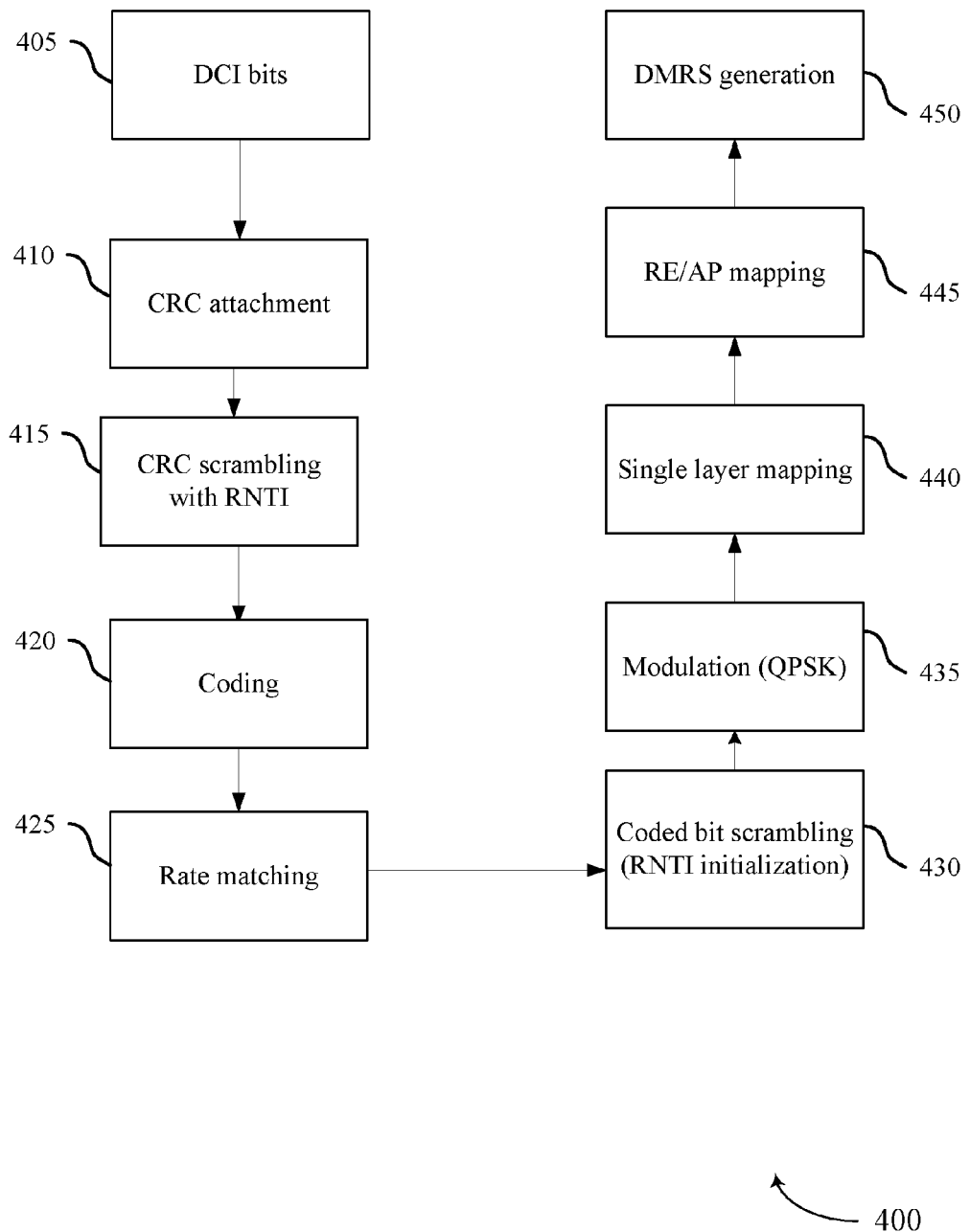
FIG. 4 illustrates an example of transmitter processing that supports bundle size determination for narrowband communication in accordance with various aspects of the present disclosure.

FIG. 4 illustrates an example 400 of transmitter processing that supports bundle size determination for narrowband communication, in accordance with various aspects of the present disclosure. Transmitter processing in example 400 may be performed by a base station, such as base stations 105 described with reference to FIGS. 1-2.

In the example 400 of FIG. 4, a base station may determine DCI information to be transmitted in a control channel transmission, such as a MPDCCH transmission, to a UE. The operations of example 400 may be performed according to established techniques for the different operations described. At block 405, the base station may determine the DCI bits that are to be included in the DCI transmission. At block 410, the base station may determine a CRC attachment to include in the control channel transmission. The CRC may then be scrambled with a RNTI for the destination UE, as indicated at block 415. According to some examples, the scrambling sequence used for the scrambling at block 415 may include a first number of bits that are associated with a RNTI, and a second number of bits that are used to indicate a bundling level of the control channel transmissions, as discussed above with respect to FIGS. 2-3. In other examples, scrambling or interleaving may be introduced in advance of block 405, with the scrambling sequence used to indicate a bundling level of the control channel transmission, as discussed above with respect to FIGS. 2-3.

At block 420, the base station may performing coding on the control channel information, which may be performed according to a modulation and coding scheme (MCS) to be used for the control channel transmission. At block 425 the base station may perform rate matching, and at block 430 the base station may perform coded bit scrambling, where the scrambling may be initialized by RNTI or other value fixed by the specification or higher layers. At block 435, the scrambled coded bits are modulated, such as according to quadrature phase shift keying (QPSK) modulation. Single layer mapping may be performed at block 440, followed by RE/AP mapping at block 445. A demodulation reference signal (DMRS) may be generated at block 450, followed by transmission of the control channel signal.

Figure 5A:
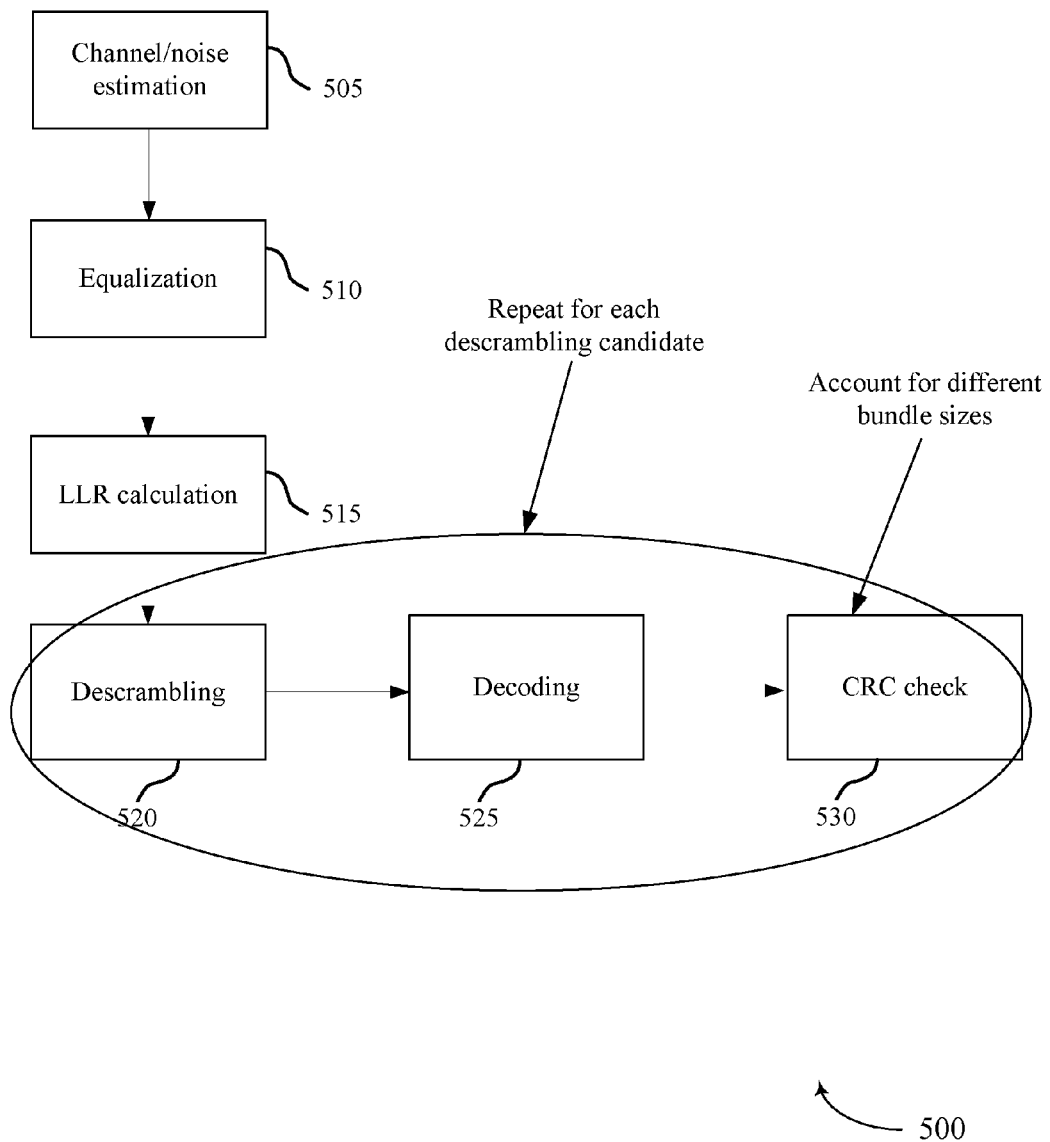
FIG. 5A illustrates an example of receiver processing that supports bundle size determination for narrowband communication in accordance with various aspects of the present disclosure.

FIG. 5A illustrates an example 500 of receiver processing that supports bundle size determination for narrowband communication, in accordance with various aspects of the present disclosure. Receiver processing in example 500 may be performed by a UE, such as UEs 115 described with reference to FIGS. 1-2.

In the example 500 of FIG. 5A, a UE may receive a control channel transmission, such as a MPDCCH transmission from a base station. The operations of example 500 may be performed according to established techniques for the different operations described. At block 505, the UE may perform channel/noise estimation. At block 410, the UE may perform equalization on the received signal, followed by a log likelihood ratio (LLR) calculation performed at block 515. In some examples, the LLR calculation may include combining prior LLR calculations from one or more prior repetitions of the signal. At block 520, the UE may perform descrambling of the received signal, followed by decoding of the received signal at block 525. The UE may then, at block 530, perform a CRC check on the descrambled and decoded information. The descrambling 520, decoding 525, and CRC check 530 may be performed, in some examples, iteratively for a number of descrambling candidates, as discussed above with respect to FIGS. 1-2. Alternatively, if scrambling or interleaving for bundle size determination is performed before coding, the UE may perform a single descrambling 520 and decoding 525, followed by a modified CRC check or multiple CRC checks 530. Following successful descrambling, decoding, and CRC checking, the corresponding descrambling candidate may be used to determine a bundling size for the control channel transmission, which may in turn be used to determine timing for a subsequent shared channel transmission and/or to determine a bundling size to be used in the subsequent shared channel transmission, as discussed above with respect to FIGS. 1-2.

Figure 5B:
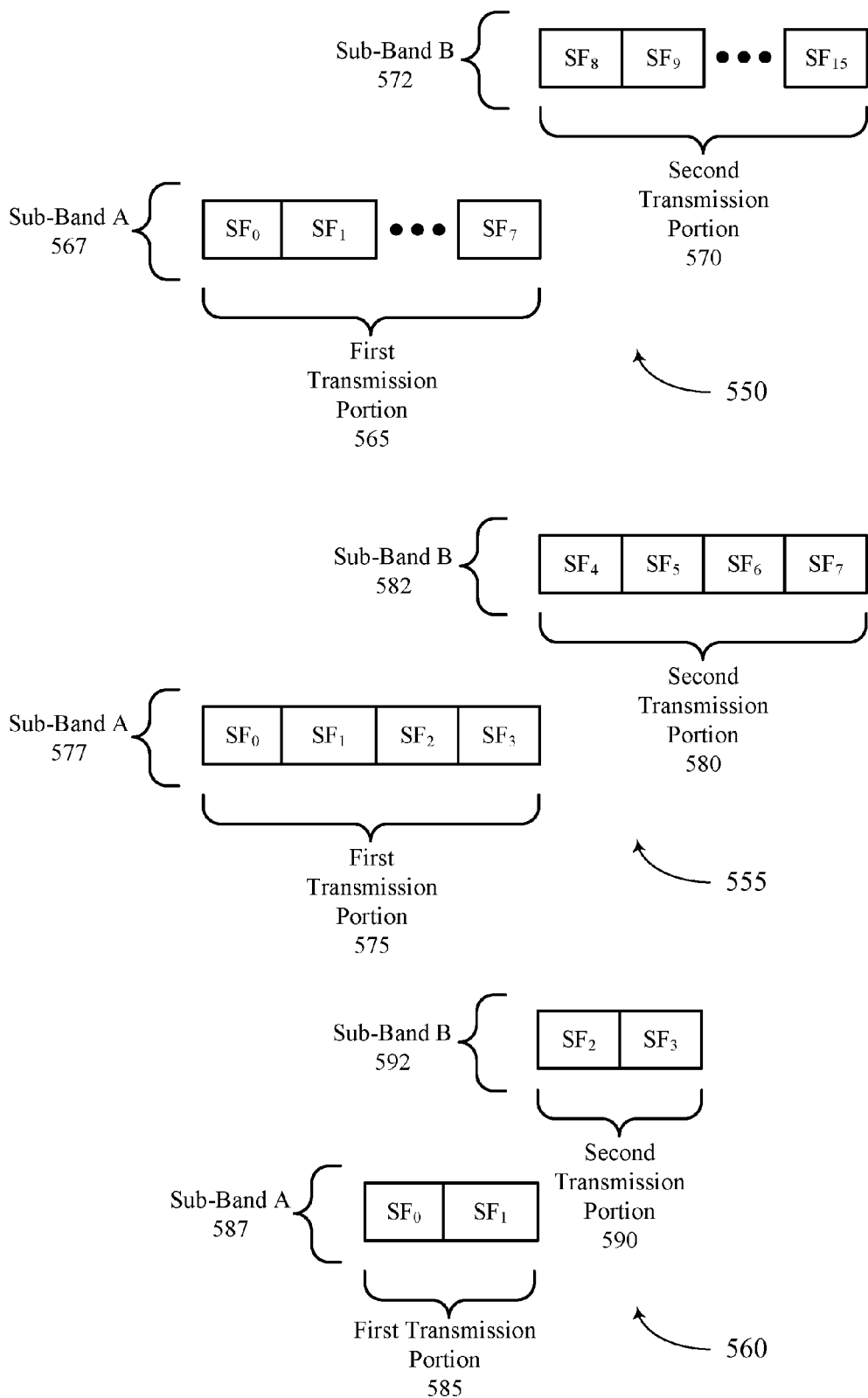
FIG. 5B illustrates examples of hopping sequences based on bundle size in accordance with various aspects of the present disclosure.

FIG. 5B illustrates several examples 550, 555, 560 of frequency hopping patterns based on bundle size, in accordance with various aspects of the present disclosure. Frequency hopping patterns 550-560 may be used by a UE or a base station, such as UEs 115 or base stations 105 described with reference to FIGS. 1-2.

In various examples, such as the examples 550-560 of FIG. 5B, a hopping granularity $Y_{CH}$ may be determined based on the lowest repetition level that is monitored. For example, in example 550, a UE may determine that a bundling size for a control channel transmission may provide 16 repetitions of control channel information, and a bundling size for a shared channel transmission may provide 16 repetitions of shared channel information. In such a case, the frequency hopping pattern may provide for a hopping granularity of eight subframes so as to provide at least one frequency transition during each repetition. In the example 550, a first transmission portion 565 may include the first eight subframes ($SF_0$-$SF_7$) transmitted using frequency sub-band A 567, and a second transmission portion 570 may include the second eight subframes ($SF_8$-$SF_{15}$) transmitted using frequency sub-band B 572. While the example 550 has control channel transmissions and shared channel transmissions that use the same bundling level, different bundle sizes may be used for control channel transmissions and shared channel transmissions, and the frequency hopping granularity may continue to be eight subframes so long as the repetition level of each of the control channel transmissions and shared channel transmissions is greater than eight (e.g., a repetition level of 12). Such a technique provides that some frequency diversity may be achieved during each repetition. Furthermore, the frequency hopping sequence of successive transmissions may be selected to provide the first transmission portion of successive transmissions may be transmitted on different frequency sub-bands, such as according to established frequency hopping techniques.

In the event that one or both of the control channel transmission or shared channel transmissions has a lower repetition level, the frequency hopping sequence may be selected to provide frequency diversity for each repetition. In example 555, one or both of the control channel transmissions or shared channel transmissions may have a repetition level of 8, in which case frequency hopping may be selected so as to change frequencies every four subframes. In this example, first transmission portion 575 may include the first four subframes ($SF_0$-$SF_3$) transmitted using frequency sub-band A 577, and a second transmission portion 580 may include the second four subframes ($SF_4$-$SF_7$) transmitted using frequency sub-band B 582. Similarly, in example, 560, the repetition level may be four, and the first transmission portion 585 may include the first two subframes ($SF_0$-$SF_1$) transmitted using frequency sub-band A 587, and second transmission portion 590 may include the second two subframes ($SF_2$-$SF_3$) transmitted using frequency sub-band B 592.

In the event of multiple bundle levels being monitored at the same time (e.g. monitoring of control channel transmissions of examples 555 and 560 at the same time), then the frequency hopping pattern may be selected to provide frequency diversity for the lowest bundling level. Otherwise, if a UE is monitoring both bundle sizes at the same time (e.g. by blind decoding), the UE may be unable to monitor transmissions 555 and 560 at the same time, as it would require monitoring two sub-bands simultaneously (e.g. sub-band A 577 for $SF_2$ in first transmission portion 575 and sub-band B 592 for $SF_2$ in second transmission portion 590). Thus, in this case, the hopping granularity $Y_{CH}$ for a set of bundle sizes might be determined from the smallest bundle size in the set of available bundle sizes (e.g., $Y_{CH}$ would be set to 2). In such a manner, if a UE is configured (e.g., via radio resource control (RRC) signaling) to monitor multiple bundle sizes, the frequency hopping sequence may be mapped by both the base station and UE to correspond to the lowest configured bundle size.

Figure 6:
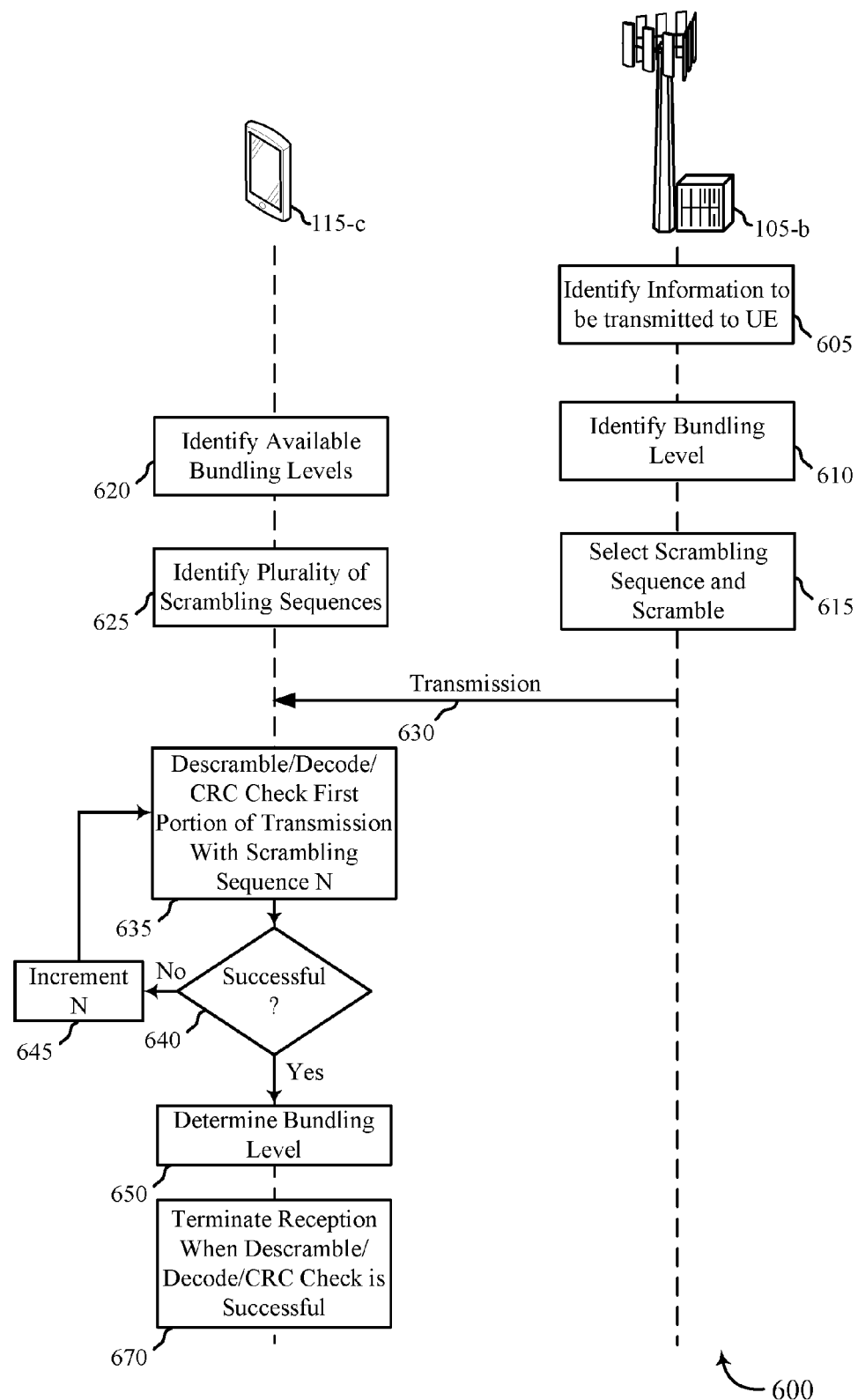
FIGS. 6-7 illustrate examples of process flows that support bundle size determination for narrowband communication in accordance with various aspects of the present disclosure.

FIG. 6 illustrates an example of a process flow 600 for bundle size determination for narrowband communication in accordance with various aspects of the present disclosure. Process flow 600 may include a UE 115-c and base station 105-b, which may be examples of a UE 115 and base station 105 described with reference to FIGS. 1-2.

In the example of FIG. 6, at block 605 the base station 105-b may identify information to be transmitted to UE 115-c. Such information may include control channel information to be transmitted in a control channel transmission, for example. At block 610, base station 105-b may identify a bundling level to be used for the transmission to the UE 115-c. The bundling level may be selected to provide coverage enhancement to the UE, and may be determined based on channel conditions between the base station 105-b and UE 115-c, for example. At block 615, the base station 105-b may select a scrambling sequence and scramble all or a portion of the control channel transmission to the UE 115-c, in a manner such as discussed above with respect to FIGS. 2-5. The base station 105-b may transmit transmission 630 to the UE 115-c. Prior to the transmission 630, the UE 115-c may identify available bundling levels at block 620, and may identify a plurality of scrambling sequences as indicated at block 625, in a manner similarly as discussed above with respect to FIGS. 2-5. Following, or during, reception of transmission 630, the UE 115-c may descramble/decode/CRC check a first portion of the transmission with scrambling sequence N, as indicated at block 635. Scrambling sequence N may be a first scrambling sequence of the plurality of scrambling sequences that were identified at block 625. At block 640, it is determined whether the descrambling/decoding/CRC check was successful. If the descrambling/decoding/CRC check was not successful, the UE 115-c may increment N and repeat the operations of blocks 635 and 640. If the descrambling/decoding/CRC check was successful, the UE 115-c may determine a bundling level of the control channel transmission, as indicated at block 650. At block 670, the UE 115-c may perform early termination of reception when descrambling/decoding/CRC check is successful prior to the reception of all of the repetitions of the control channel information. Alternatively, the UE may perform a single descrambling/decoding followed by multiple CRC checks, where each of the multiple CRC checks are performed according to the scrambling sequence N. In yet another example, the UE might perform a single descrambling/decoding/CRC check at block 635, where the CRC check comprises checking a reduced number of bits (e.g. 14 bits instead of 16), and the remaining bits (e.g. 2 bits) are used to determine the bundle level at block 650.

In some examples the control channel information may include data and a CRC associated with the data, as discussed above. In some examples the CRC is scrambled with a radio network temporary identifier (RNTI) of the UE 115-c and one or more bits that indicate the bundling level. In other examples both the data and CRC may be scrambled with a scrambling sequence that indicates a bundling level of the transmission 630. In further examples, the data and CRC may be interleaved according to a scrambling pattern that indicated the bundling level of the transmission 630, and the UE 115-c, when descrambling the transmission 630, may iteratively deinterleave the information using a set of available interleaving sequences and determine the bundling level of the transmission 630.

Figure 7:
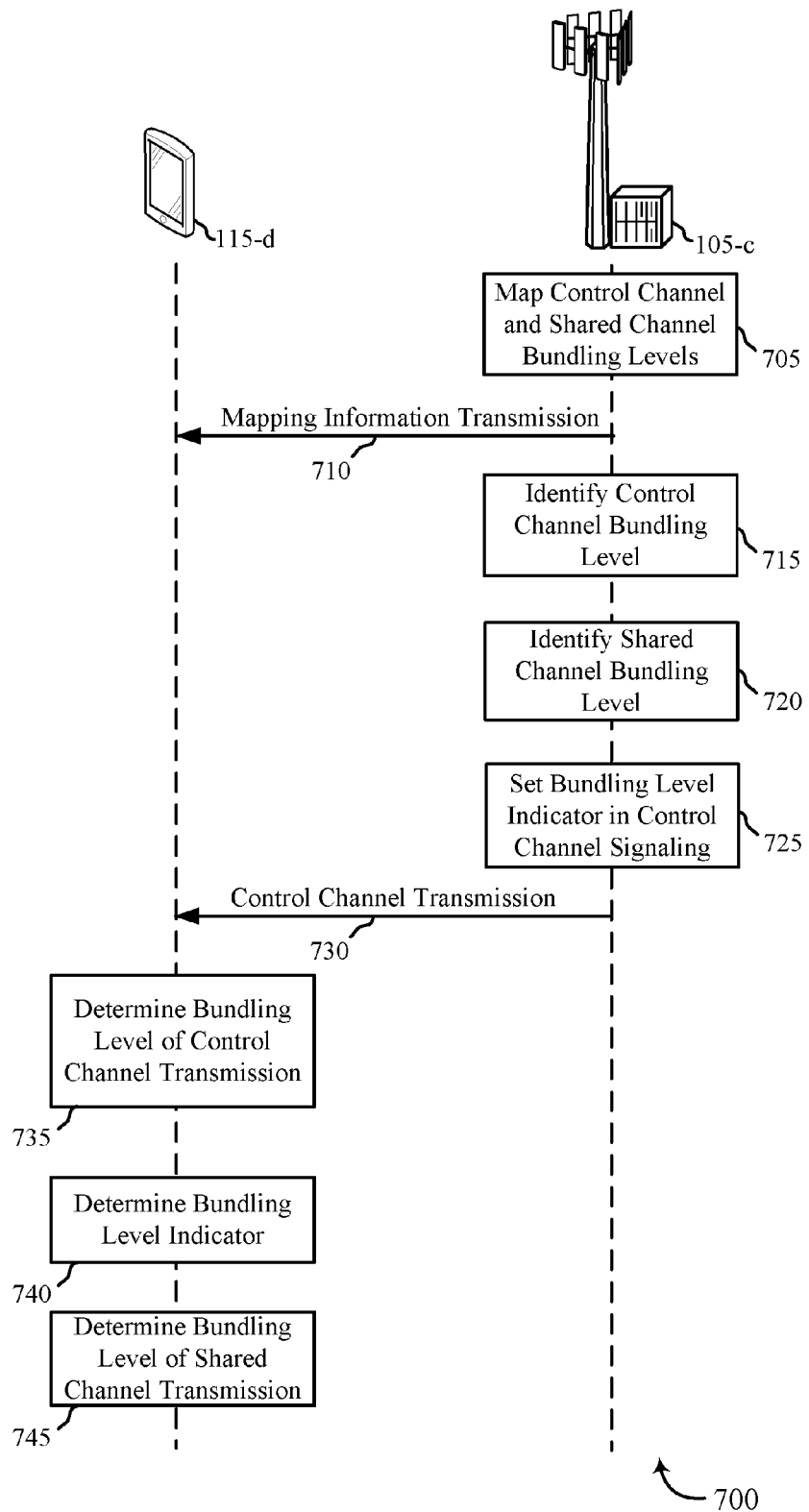

FIG. 7 illustrates an example of a process flow 700 for bundle size determination for narrowband communication in accordance with various aspects of the present disclosure. Process flow 700 may include a UE 115-d and base station 105-c, which may be examples of a UE 115 and base station 105 described with reference to FIGS. 1-2.

In the example of FIG. 7, at block 705 the base station 105-c may map control channel and shared channel bundling levels, in a manner similarly as discussed above with respect to FIGS. 2-3. Base station 105-c may transmit mapping information transmission 710 to UE 115-d. Such a mapping information transmission 710 may be, for example, a SIB transmission or RRC signaling transmission. At block 715, the base station 105-c may identify a control channel bundling level. At block 720, the base station 105-c may identify a shared channel bundling level. Based on the mapping of block 705 the base station 105-c may set a bundling level indicator in the control channel signaling, as indicated at block 725.

The base station 105-c may then transmit control channel transmission 730 to UE 115-d. The UE 115-d may determine a bundling level of the control channel transmission 730, as indicated at block 735. Such a determination may be made according to techniques such as discussed above with respect to FIGS. 2-6. At block 740, the UE 115-d may determine the bundling level indicator that was included with control channel transmission 730. The UE 115-d may use the bundling level indicator, along with a bundling level of the control channel transmission 730, to determine a bundling level of a subsequent shared channel transmission, as indicated at block 745. The bundling level of the subsequent shared channel transmission may be based on, for example, the bundling level of the control channel transmission 730 and the bundling level indicator, such as through the mapping information provided in mapping information transmission 710. In some examples, rather than having a mapping information transmission 710, the mapping may be established in a specification for wireless communication.

Figure 8:
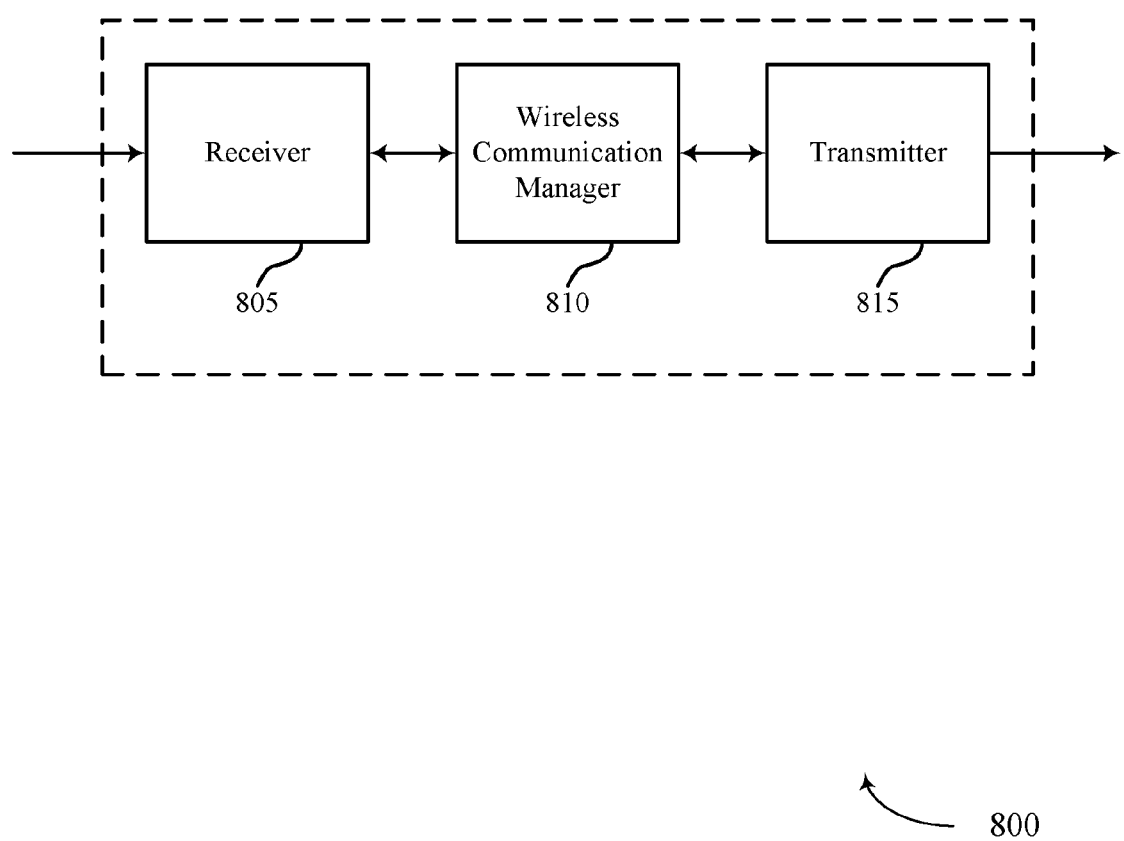
FIGS. 8-10 show block diagrams of a wireless device that supports bundle size determination for narrowband communication in accordance with various aspects of the present disclosure.

FIG. 8 shows a block diagram of a wireless device 800 configured for bundle size determination for narrowband communication in accordance with various aspects of the present disclosure. Wireless device 800 may be an example of aspects of a UE 115 described with reference to FIGS. 1-7. Wireless device 800 may include a receiver 805, a wireless communication manager 810, or a transmitter 815. Wireless device 800 may also include a processor. Each of these components may be in communication with each other.

The receiver 805 may receive information such as packets, user data, or control information associated with various information channels (e.g., control channels, data channels, and information related to bundle size determination, etc.). Information may be passed on to the wireless communication manager 810, and to other components of wireless device 800.

The wireless communication manager 810 may, using techniques such as described with reference to FIGS. 1-7, identify a plurality of available bundling levels indicating a number of redundant versions of information included in a first transmission, identify a plurality of scrambling sequences for descrambling the first transmission with each of the plurality of scrambling sequences associated with one of the available bundling levels, descramble at least a portion of the first transmission using a first scrambling sequence of the identified scrambling sequences, and determine the bundling level used for the first transmission based at least in part on successful descrambling of at least the portion of the first transmission using the first scrambling sequence.

The transmitter 815 may transmit signals received from other components of wireless device 800. In some examples, the transmitter 815 may be collocated with the receiver 805 in a transceiver module. The transmitter 815 may include a single antenna, or it may include a plurality of antennas.

Figure 9:
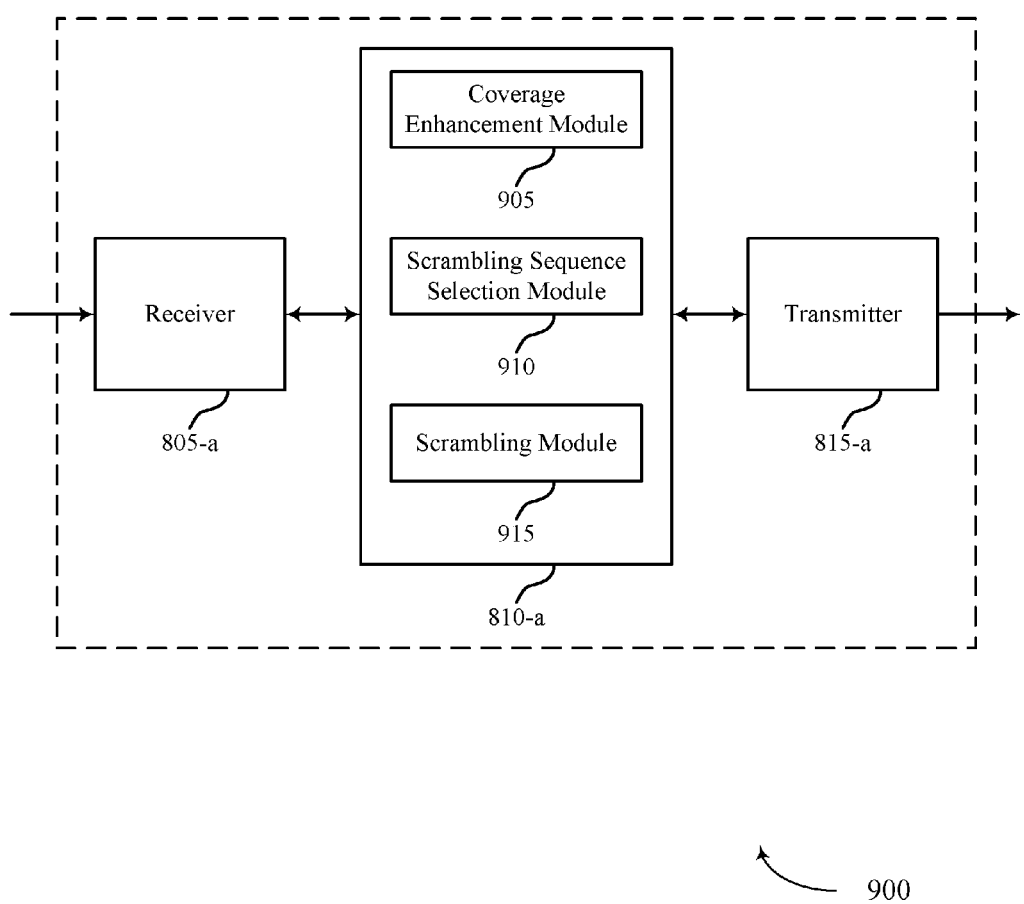

FIG. 9 shows a block diagram of a wireless device 900 for bundle size determination for narrowband communication in accordance with various aspects of the present disclosure. Wireless device 900 may be an example of aspects of a wireless device 800 or a UE 115 described with reference to FIGS. 1-8. Wireless device 900 may include a receiver 805-a, a wireless communication manager 810-a, or a transmitter 815-a. Wireless device 900 may also include a processor. Each of these components may be in communication with each other. The wireless communication manager 810-a may also include a coverage enhancement module 905, a scrambling sequence selection module 910, and a scrambling module 915.

The receiver 805-a may receive information which may be passed on to wireless communication manager 810-a, and to other components of wireless device 900. The wireless communication manager 810-a may perform the operations described with reference to FIG. 8. The transmitter 815-a may transmit signals received from other components of wireless device 900.

The coverage enhancement module 905 may identify a plurality of available bundling levels indicating a number of redundant versions of information included in a first transmission as described with reference to FIGS. 2-7. The coverage enhancement module 905 may also determine the bundling level used for the first transmission based at least in part on successful descrambling of at least the portion of the first transmission using the first scrambling sequence. In some examples, the coverage enhancement module may determine, based at least in part on the bundling level, that multiple redundant versions of the information are included in the first transmission. The coverage enhancement module 905 may, in some examples, iteratively descramble, decode, and CRC check the first transmission using identified scrambling sequences, and determine the bundling level used for the first transmission based on which of the scrambling sequences was successful in descrambling of at least the portion of the first transmission. In some examples, the scrambling sequence may be an interleaving sequence.

The coverage enhancement module 905, in further examples, may also determine a first bundling level of a received control channel transmission, and may then determine a second bundling level of a first shared channel transmission based at least in part on the first bundling level and a bundling level indicator provided in the received control channel transmission. In some examples, the second bundling level may be determined based on a mapping between the second bundling level, the first bundling level, and information contained in the bundling level indicator.

The scrambling sequence selection module 910 may identify a plurality of scrambling sequences for descrambling the first transmission, each of the plurality of scrambling sequences associated with one of the available bundling levels as described with reference to FIGS. 2-7. In some examples, the scrambling sequence may be further selected based at least in part on a RNTI of the receiver. In some examples, the scrambling sequence may include an interleaving sequence, selected from a plurality of available interleaving sequences, for interleaving the data.

The scrambling module 915 may descramble at least a portion of the first transmission using a first scrambling sequence of the identified scrambling sequences, as described with reference to FIGS. 2-7. The scrambling module 915 may also determine that the first scrambling sequence was unsuccessful in descrambling at least the portion of the first transmission, and may iteratively attempt to descramble at least the portion of the first transmission using other of the plurality of scrambling sequences. In some examples, the information comprises data and a CRC associated with the data, and wherein descrambling the portion of the first transmission comprises descrambling the CRC using the first scrambling sequence. In some examples, the CRC may be scrambled with a RNTI and one or more bits that indicate the bundling level. In other examples, both the data and the CRC may be scrambled using the first scrambling sequence.

Figure 10:
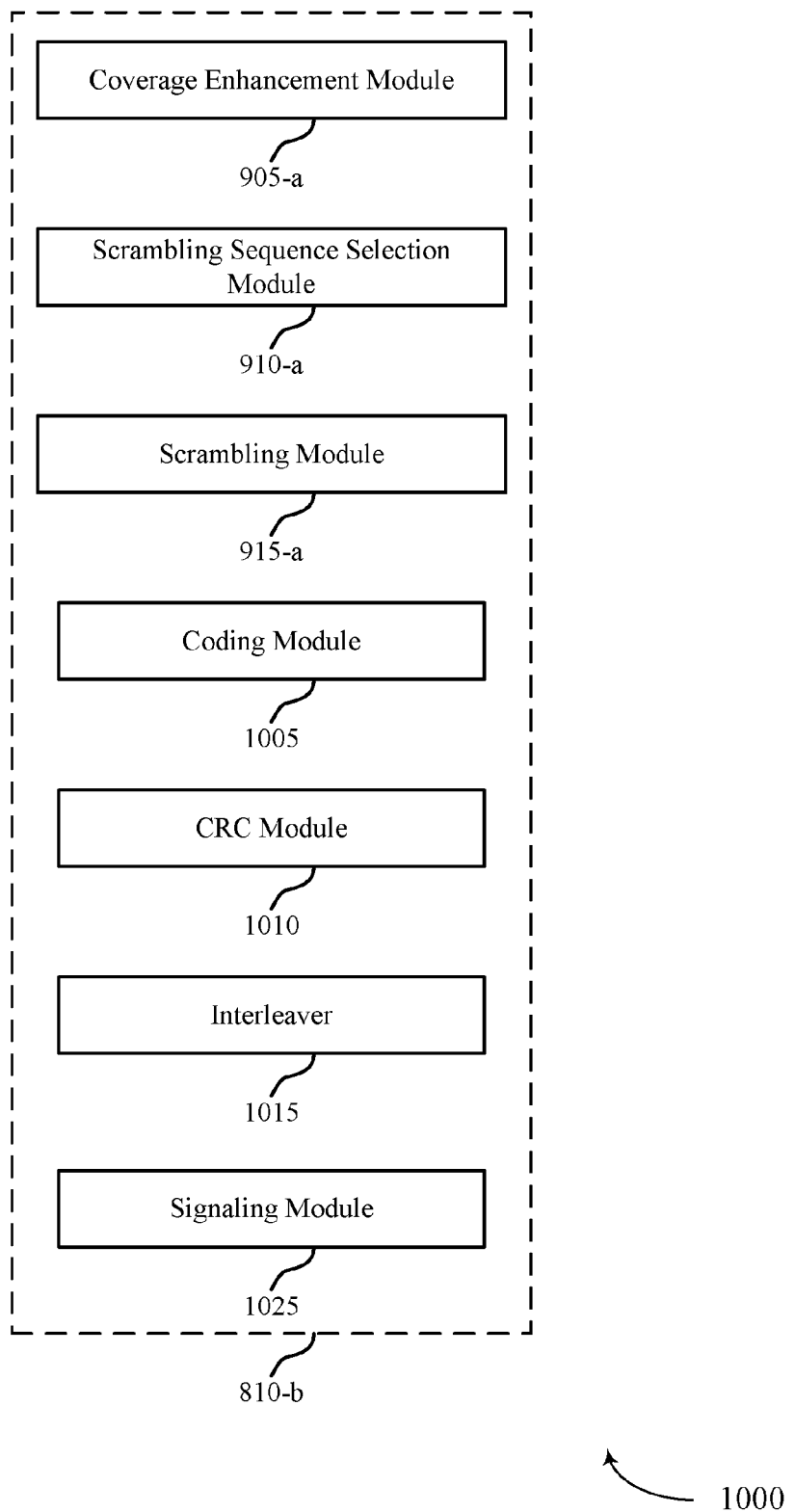

FIG. 10 shows a block diagram 1000 of a wireless communication manager 810-b which may be a component of a wireless device 800 or a wireless device 900 for bundle size determination for narrowband communication in accordance with various aspects of the present disclosure. The wireless communication manager 810-b may be an example of aspects of a wireless communication manager 810 described with reference to FIGS. 8-9. The wireless communication manager 810-b may include a coverage enhancement module 905-a, a scrambling sequence selection module 910-a, and a scrambling module 915-a. Each of these modules may perform the functions described with reference to FIG. 9. The wireless communication manager 810-b may also include a coding module 1005, a CRC module 1010, an interleaver 1015, and a signaling module 1025.

The coding module 1005 may decode the portion of the descrambled first transmission using one or more available decoding schemes, the portion of the descrambled first transmission including a first redundant version of the information included in the first transmission as described with reference to FIGS. 2-7. The coding module 1005 may also determine if the information is successfully decoded, and may also determine whether to terminate reception of the first transmission based at least in part on the information being successfully decoded.

The CRC module 1010 may determine if the information is successfully decoded is based at least in part on a cyclic redundancy check (CRC) as described with reference to FIGS. 2-7.

The interleaver 1015, in some examples, may descramble the portion of the first transmission by deinterleaving the first transmission according to a first interleaving sequence of a plurality of available interleaving sequences as described with reference to FIGS. 2-7.

The signaling module 1025 may receive an indicator in a control information field to indicate bundling levels for transmissions to be received in one or more shared channel transmissions, the bundling levels indicating a number of redundant versions of information to be included in the one or more shared channel transmissions as described with reference to FIGS. 2-7. In some examples, the mapping may be received prior to the control channel transmission. In some examples, the mapping may be received in one or more of a system information block (SIB) or radio resource control (RRC) configuration information. In some examples, the mapping may be established in a specification for wireless communication. In some examples, the control information field may be an information field received in downlink control information (DCI) from a transmitter.

The hopping module 1030 may receive bundling level information, may identify a number of different available hopping sequences, and may determine the hopping sequence used for a particular transmission based at least in part on the bundling level information. As discussed above, the hopping sequence selected for a particular transmission may be determined based on a lowest configured bundling level. For example, wireless device 800 or wireless device 900 may be configured (e.g., via radio resource control (RRC) signaling) for bundle sizes 4, 8 and 16, and based on this configuration may determine that $Y_{CH}$ is 2, similarly as discussed above with respect to FIG. 5B. Similarly, if the wireless device 800 or wireless device 900 is configured for bundle size 8 and 16, then $Y_{CH}$ would be 4. Such hopping granularity in these examples is for the case of hopping between 2 frequency sub-bands only, and other hopping granularity may be selected based on a particular hopping techniques and numbers of frequency sub-bands used for the particular hopping techniques.

Figure 11:
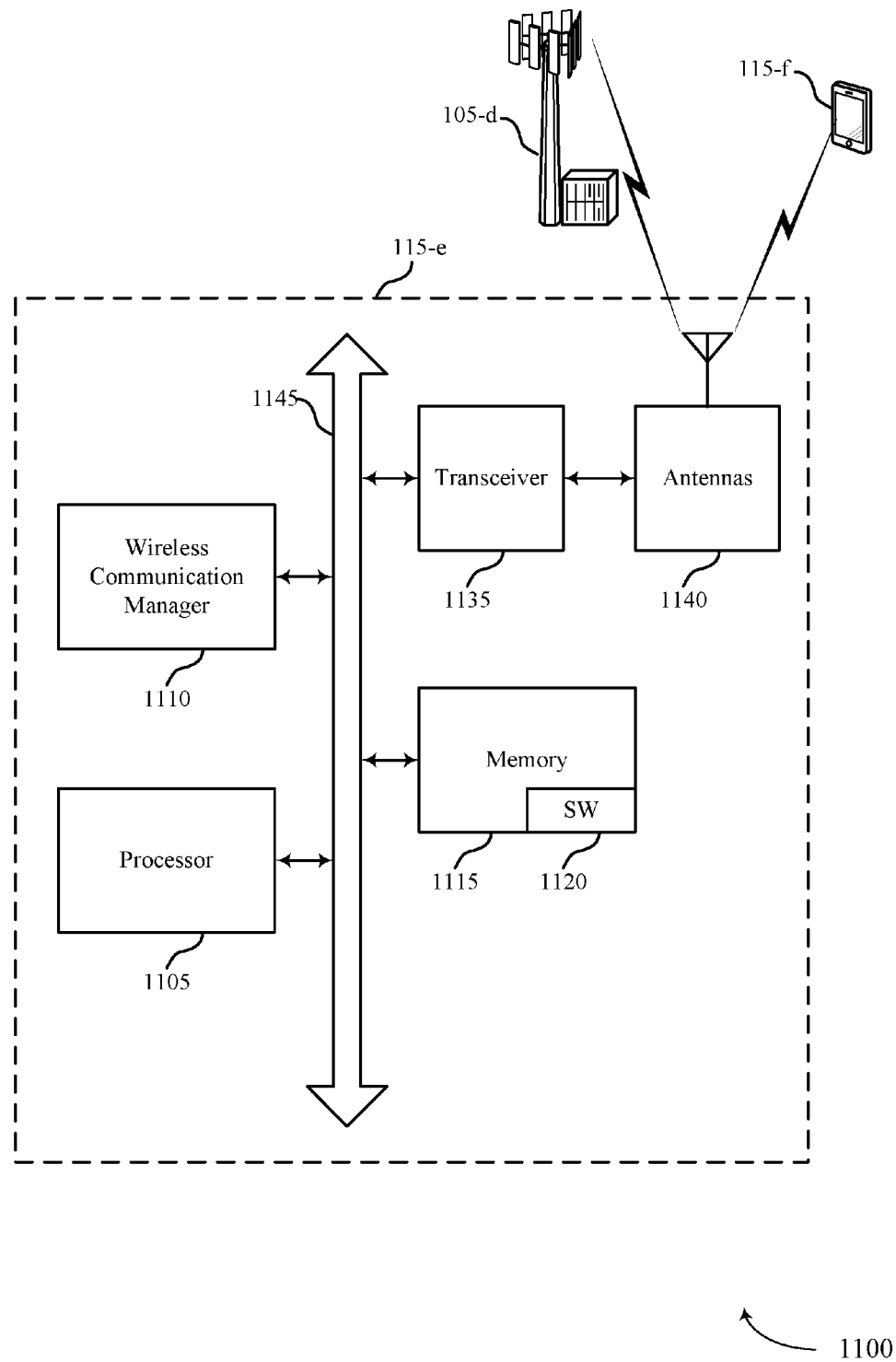
FIG. 11 illustrates a block diagram of a system including a user equipment (UE) that supports bundle size determination for narrowband communication in accordance with various aspects of the present disclosure.

FIG. 11 shows a diagram of a system 1100 including a UE 115 configured for bundle size determination for narrowband communication in accordance with various aspects of the present disclosure. System 1100 may include UE 115-e, which may be an example of a wireless device 800, a wireless device 900, or a UE 115 described with reference to FIGS. 1, 2, and 6-10. UE 115-e may include a wireless communication manager 1110, which may be an example of a wireless communication manager 810 described with reference to FIGS. 8-10. UE 115-e may also include components for bi-directional voice and data communications including components for transmitting communications and components for receiving communications. For example, UE 115-e may communicate bi-directionally with base station 105-d or UE 115-f.

UE 115-e may also include a processor 1105, and memory 1115 (including software (SW)) 1120, a transceiver 1135, and one or more antenna(s) 1140, each of which may communicate, directly or indirectly, with one another (e.g., via buses 1145). The transceiver 1135 may communicate bi-directionally, via the antenna(s) 1140 or wired or wireless links, with one or more networks, as described above. For example, the transceiver 1135 may communicate bi-directionally with a base station 105 or another UE 115. The transceiver 1135 may include a modem to modulate the packets and provide the modulated packets to the antenna(s) 1140 for transmission, and to demodulate packets received from the antenna(s) 1140. While UE 115-e may include a single antenna 1140, UE 115-e may also have multiple antennas 1140 capable of concurrently transmitting or receiving multiple wireless transmissions.

The memory 1115 may include random access memory (RAM) and read only memory (ROM). The memory 1115 may store computer-readable, computer-executable software/firmware code 1120 including instructions that, when executed, cause the processor 1105 to perform various functions described herein (e.g., bundle size determination for narrowband communication, etc.). Alternatively, the software/firmware code 1120 may not be directly executable by the processor 1105 but cause a computer (e.g., when compiled and executed) to perform functions described herein. The processor 1105 may include an intelligent hardware device, (e.g., a central processing unit (CPU), a microcontroller, an application specific integrated circuit (ASIC), etc.)

Figure 12:
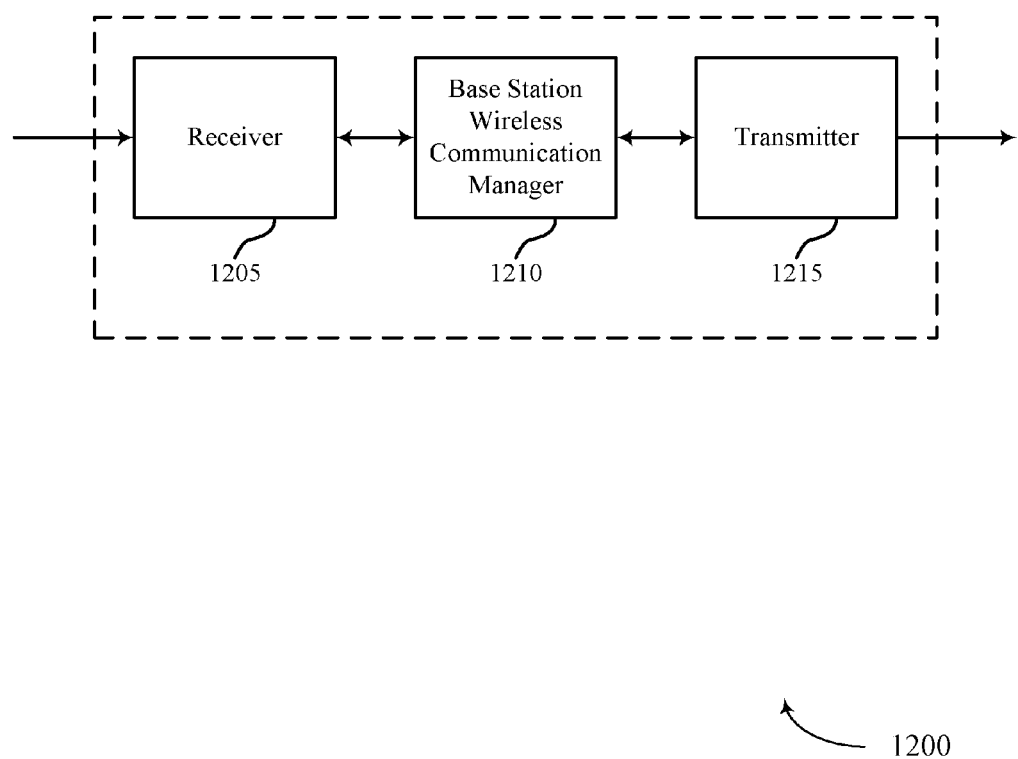
FIGS. 12-14 show block diagrams of a wireless device that supports bundle size determination for narrowband communication in accordance with various aspects of the present disclosure.

FIG. 12 shows a block diagram of a wireless device 1200 configured for bundle size determination for narrowband communication in accordance with various aspects of the present disclosure. Wireless device 1200 may be an example of aspects of a base station 105 described with reference to FIGS. 1-11. Wireless device 1200 may include a receiver 1205, a base station wireless communication manager 1210, or a transmitter 1215. Wireless device 1200 may also include a processor. Each of these components may be in communication with each other.

The receiver 1205 may receive information such as packets, user data, or control information associated with various information channels (e.g., control channels, shared channels, and information related to bundle size determination for narrowband communication, etc.). Information may be passed on to the base station wireless communication manager 1210, and to other components of wireless device 1200.

The base station wireless communication manager 1210 may, according to techniques such as discussed with respect to FIGS. 2-7, identify information to be transmitted to a receiver, identify a bundling level indicating a number of redundant versions of the information to be transmitted, select, based at least in part on the bundling level, a scrambling sequence for scrambling the information prior to transmission of the information, and scramble the information based at least in part on the selected scrambling sequence.

The transmitter 1215 may transmit signals received from other components of wireless device 1200. In some examples, the transmitter 1215 may be collocated with the receiver 1205 in a transceiver module. The transmitter 1215 may include a single antenna, or it may include a plurality of antennas.

Figure 13:
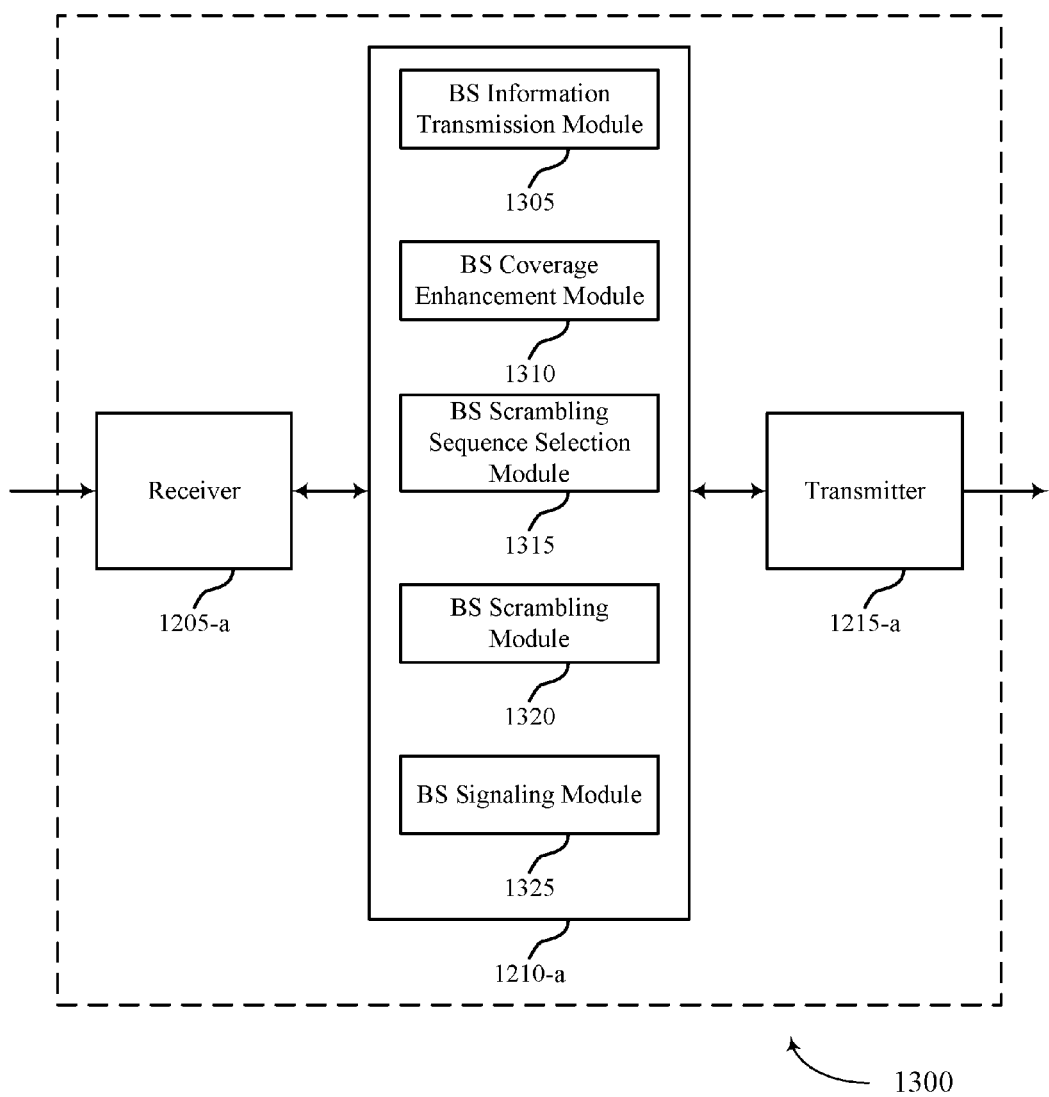

FIG. 13 shows a block diagram of a wireless device 1300 for bundle size determination for narrowband communication in accordance with various aspects of the present disclosure. Wireless device 1300 may be an example of aspects of a wireless device 1200 or a base station 105 described with reference to FIGS. 1-12. Wireless device 1300 may include a receiver 1205-a, a base station wireless communication manager 1210-a, or a transmitter 1215-a. Wireless device 1300 may also include a processor. Each of these components may be in communication with each other. The base station wireless communication manager 1210-a may also include a BS information transmission module 1305, a BS coverage enhancement module 1310, a BS scrambling sequence selection module 1315, a BS scrambling module 1320, and a BS signaling module 1325.

The receiver 1205-a may receive information which may be passed on to base station wireless communication manager 1210-a, and to other components of wireless device 1300. The base station wireless communication manager 1210-a may perform the operations described with reference to FIG. 12. The transmitter 1215-a may transmit signals received from other components of wireless device 1300.

The BS information transmission module 1305 may identify information to be transmitted to a receiver as described with reference to FIGS. 2-7.

The BS coverage enhancement module 1310 may identify a bundling level indicating a number of redundant versions of the information to be transmitted as described with reference to FIGS. 2-7.

The BS scrambling sequence selection module 1315 may select, based at least in part on the bundling level, a scrambling sequence for scrambling the information prior to transmission of the information as described with reference to FIGS. 2-7.

The BS scrambling module 1320 may scramble the information based at least in part on the selected scrambling sequence as described with reference to FIGS. 2-7.

The BS signaling module 1325 may set an indicator in a control information field to indicate the second bundling level based at least in part on the first bundling level and the second bundling level as described with reference to FIGS. 2-7.

Figure 14:
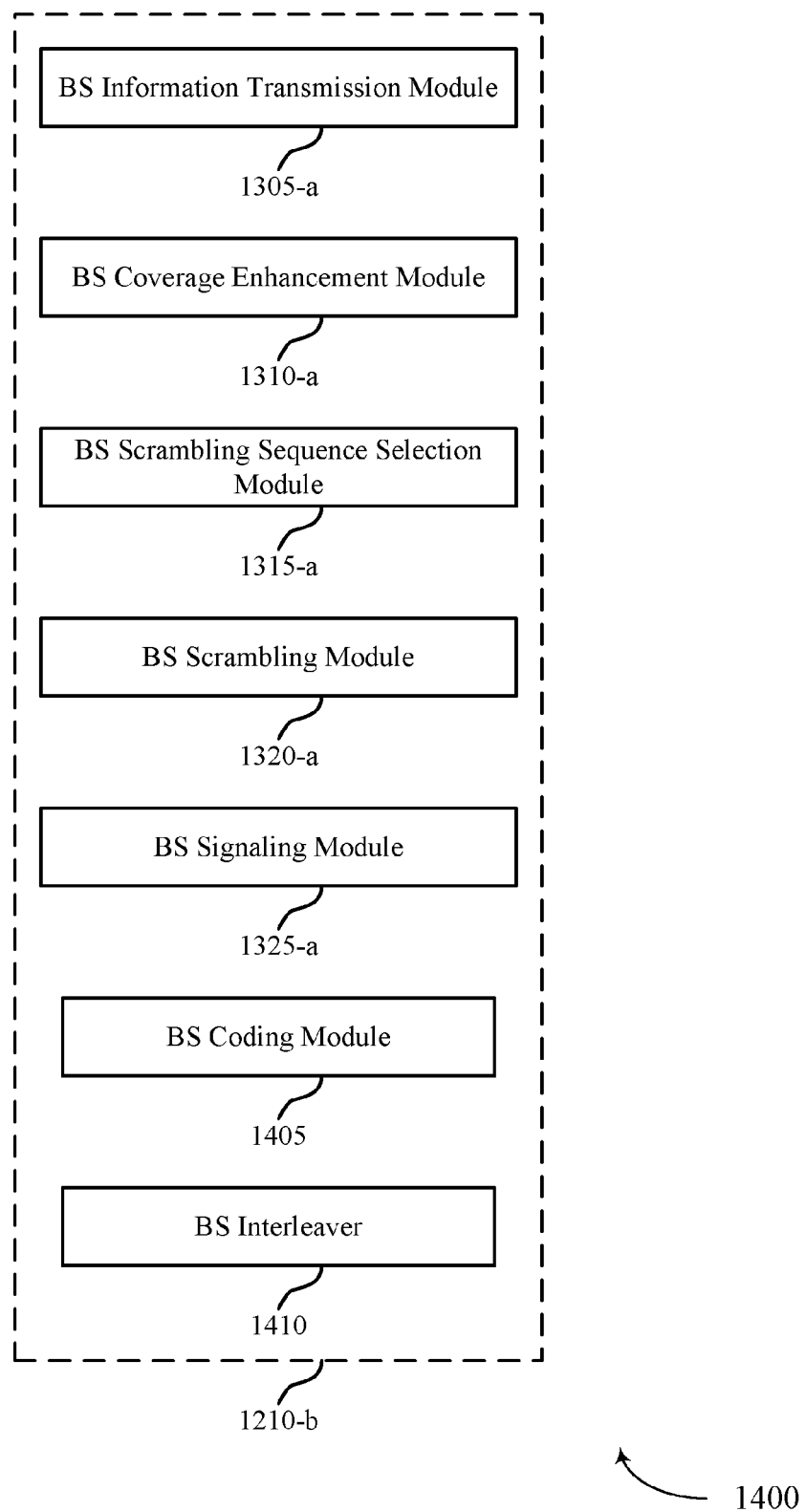

FIG. 14 shows a block diagram 1400 of a base station wireless communication manager 1210-b which may be a component of a wireless device 1200 or a wireless device 1300 for bundle size determination for narrowband communication in accordance with various aspects of the present disclosure. The base station wireless communication manager 1210-b may be an example of aspects of a base station wireless communication manager 1210 described with reference to FIGS. 12-13. The base station wireless communication manager 1210-b may include a BS information transmission module 1305-a, a BS coverage enhancement module 1310-a, a BS scrambling sequence selection module 1315-a, a BS scrambling module 1320-a, and a BS signaling module 1325-a. Each of these modules may perform the functions described with reference to FIG. 13. The base station wireless communication manager 1210-b may also include a BS coding module 1405, and a BS interleaver 1410.

The BS coding module 1405 may code the scrambled information according to a coding scheme as described with reference to FIGS. 2-7.

The BS interleaver 1410 may scramble the information by interleaving the information using a selected interleaving sequence as described with reference to FIGS. 2-7.

Figure 15:
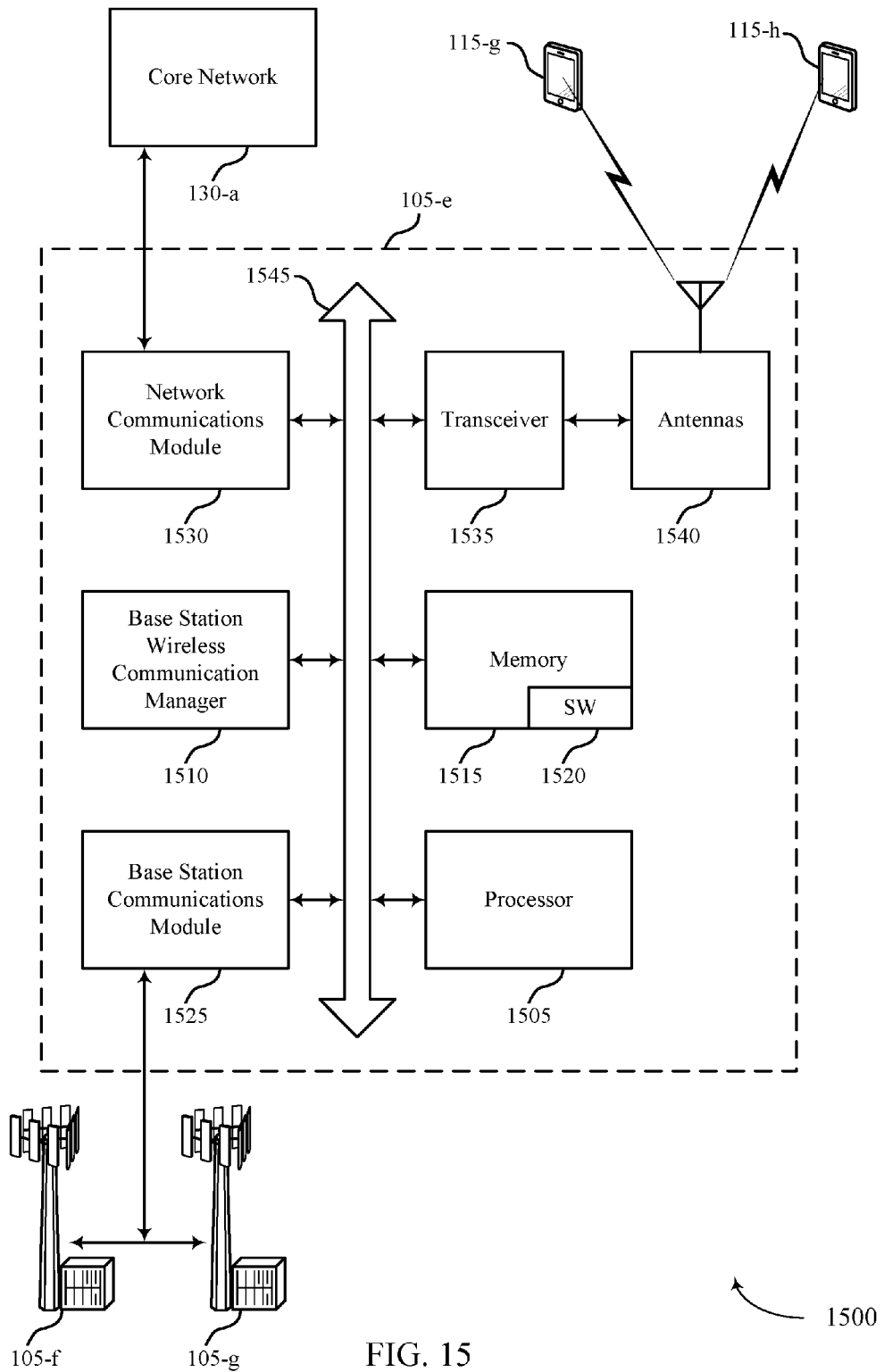
FIG. 15 illustrates a block diagram of a system including a base station that supports bundle size determination for narrowband communication in accordance with various aspects of the present disclosure.

FIG. 15 shows a diagram of a system 1500 including a base station 105 configured for bundle size determination for narrowband communication in accordance with various aspects of the present disclosure. System 1500 may include base station 105-e, which may be an example of a wireless device 1200, a wireless device 1300, or a base station 105 described with reference to FIGS. 1, 2, 6, 7, and 12-14. Base Station 105-e may include a base station wireless communication manager 1510, which may be an example of a base station wireless communication manager 1210 described with reference to FIGS. 12-14. Base Station 105-*e* may also include components for bi-directional voice and data communications including components for transmitting communications and components for receiving communications. For example, base station 105-*e* may communicate bi-directionally with UE 115-*g* or UE 115-*h*.

In some cases, base station 105-*e* may have one or more wired backhaul links. Base station 105-*e* may have a wired backhaul link (e.g., S1 interface, etc.) to the core network 130. Base station 105-*e* may also communicate with other base stations 105, such as base station 105-*f* and base station 105-*g* via inter-base station backhaul links (e.g., an X2 interface). Each of the base stations 105 may communicate with UEs 115 using the same or different wireless communications technologies. In some cases, base station 105-*e* may communicate with other base stations such as 105-*f* or 105-*g* utilizing base station communication module 1525. In some examples, base station communication module 1525 may provide an X2 interface within a Long Term Evolution (LTE)/LTE-A wireless communication network technology to provide communication between some of the base stations 105. In some examples, base station 105-*e* may communicate with other base stations through core network 130. In some cases, base station 105-*e* may communicate with the core network 130 through network communications module 1530.

The base station 105-*e* may include a processor 1505, memory 1515 (including software (SW) 1520), transceiver 1535, and antenna(s) 1540, which each may be in communication, directly or indirectly, with one another (e.g., over bus system 1545). The transceiver 1535 may be configured to communicate bi-directionally, via the antenna(s) 1540, with the UEs 115, which may be multi-mode devices. The transceiver 1535 (or other components of the base station 105-*e*) may also be configured to communicate bi-directionally, via the antennas 1540, with one or more other base stations (not shown). The transceiver 1535 may include a modem configured to modulate the packets and provide the modulated packets to the antennas 1540 for transmission, and to demodulate packets received from the antennas 1540. The base station 105-*e* may include multiple transceivers 1535, each with one or more associated antennas 1540. The transceiver may be an example of a combined receiver 1205 and transmitter 1215 of FIG. 12.

The memory 1515 may include RAM and ROM. The memory 1515 may also store computer-readable, computer-executable software code 1520 containing instructions that are configured to, when executed, cause the processor 1510 to perform various functions described herein (e.g., bundle size determination for narrowband communication, selecting coverage enhancement techniques, call processing, message routing, etc.). Alternatively, the software 1520 may not be directly executable by the processor 1505 but be configured to cause the computer, e.g., when compiled and executed, to perform functions described herein. The processor 1505 may include an intelligent hardware device, e.g., a CPU, a microcontroller, an ASIC, etc. The processor 1505 may include various special purpose processors such as encoders, queue processing modules, base band processors, radio head controllers, digital signal processor (DSPs), and the like.

The base station communications module 1525 may manage communications with other base stations 105. In some cases, a communications management module may include a controller or scheduler for controlling communications with UEs 115 in cooperation with other base stations 105. For example, the base station communications module 1525 may coordinate scheduling for transmissions to UEs 115 for various interference mitigation techniques such as beamforming or joint transmission.

The components of wireless device 800, wireless device 900, wireless communication manager 810, wireless device 1200, wireless device 1300, and base station wireless communication manager 1210 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 16:
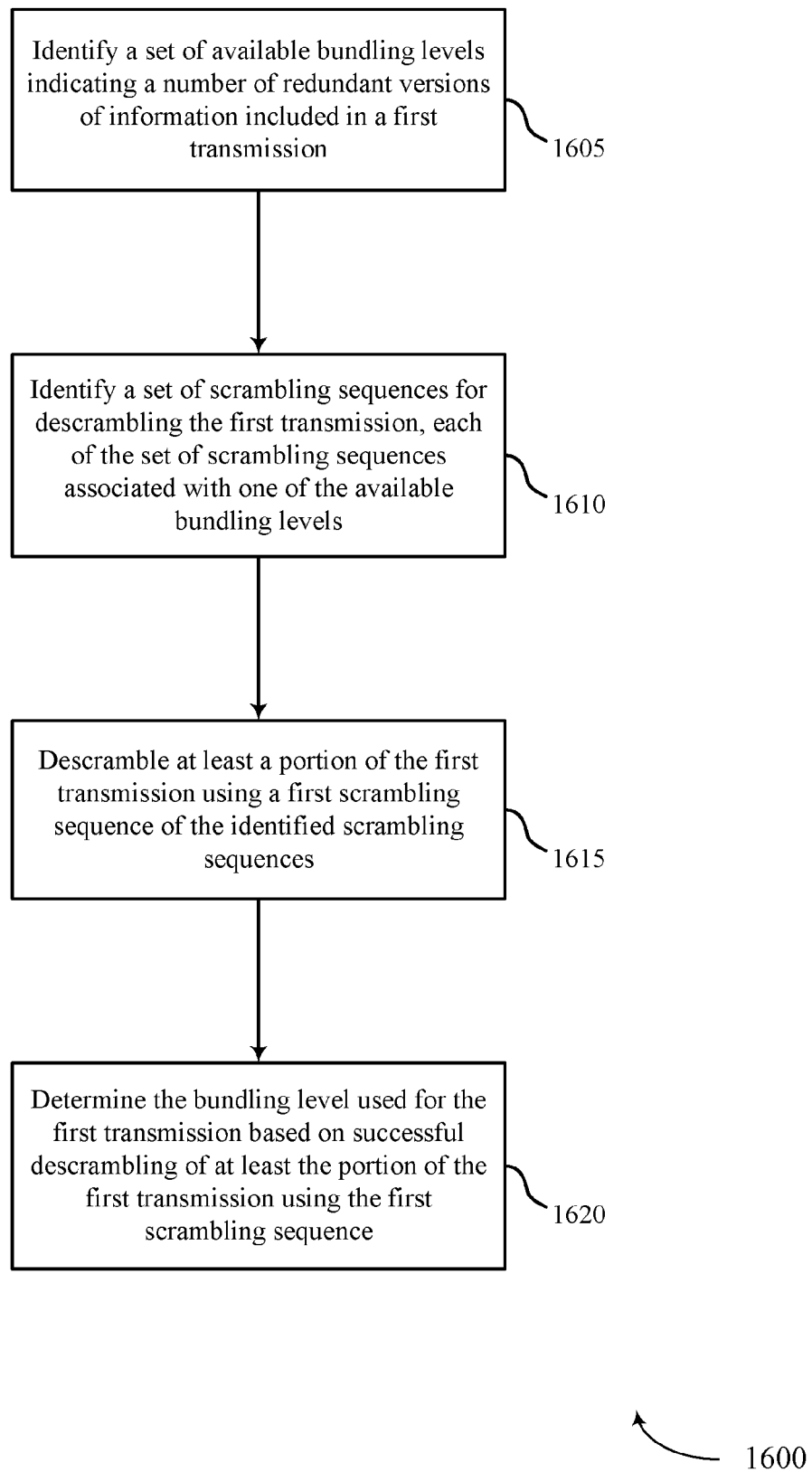
FIGS. 16-22 illustrate methods for bundle size determination for narrowband communication in accordance with various aspects of the present disclosure.

FIG. 16 shows a flowchart illustrating a method 1600 for bundle size determination for narrowband communication in accordance with various aspects of the present disclosure. The operations of method 1600 may be implemented by a UE 115 or its components as described with reference to FIGS. 1-15. For example, the operations of method 1600 may be performed by the wireless communication manager 810 as described with reference to FIGS. 8-11. In some examples, a UE 115 may execute a set of codes to control the functional elements of the UE 115 to perform the functions described below. Additionally or alternatively, the UE 115 may perform aspects the functions described below using special-purpose hardware.

At block 1605, the UE 115 may identify a plurality of available bundling levels indicating a number of redundant versions of information included in a first transmission as described with reference to FIGS. 2-7. In some examples, the operations of block 1605 may be performed by the coverage enhancement module 905 as described with reference to FIG. 9.

At block 1610, the UE 115 may identify a plurality of scrambling sequences for descrambling the first transmission, each of the plurality of scrambling sequences associated with one of the available bundling levels as described with reference to FIGS. 2-7. In some examples, the operations of block 1610 may be performed by the scrambling sequence selection module 910 as described with reference to FIG. 9.

At block 1615, the UE 115 may descramble at least a portion of the first transmission using a first scrambling sequence of the identified scrambling sequences as described with reference to FIGS. 2-7. In some examples, the operations of block 1615 may be performed by the scrambling module 915 as described with reference to FIG. 9.

At block 1620, the UE 115 may determine the bundling level used for the first transmission based at least in part on successful descrambling of at least the portion of the first transmission using the first scrambling sequence as described with reference to FIGS. 2-7. In some examples, the operations of block 1620 may be performed by the coverage enhancement module 905 as described with reference to FIG. 9.

Figure 17:
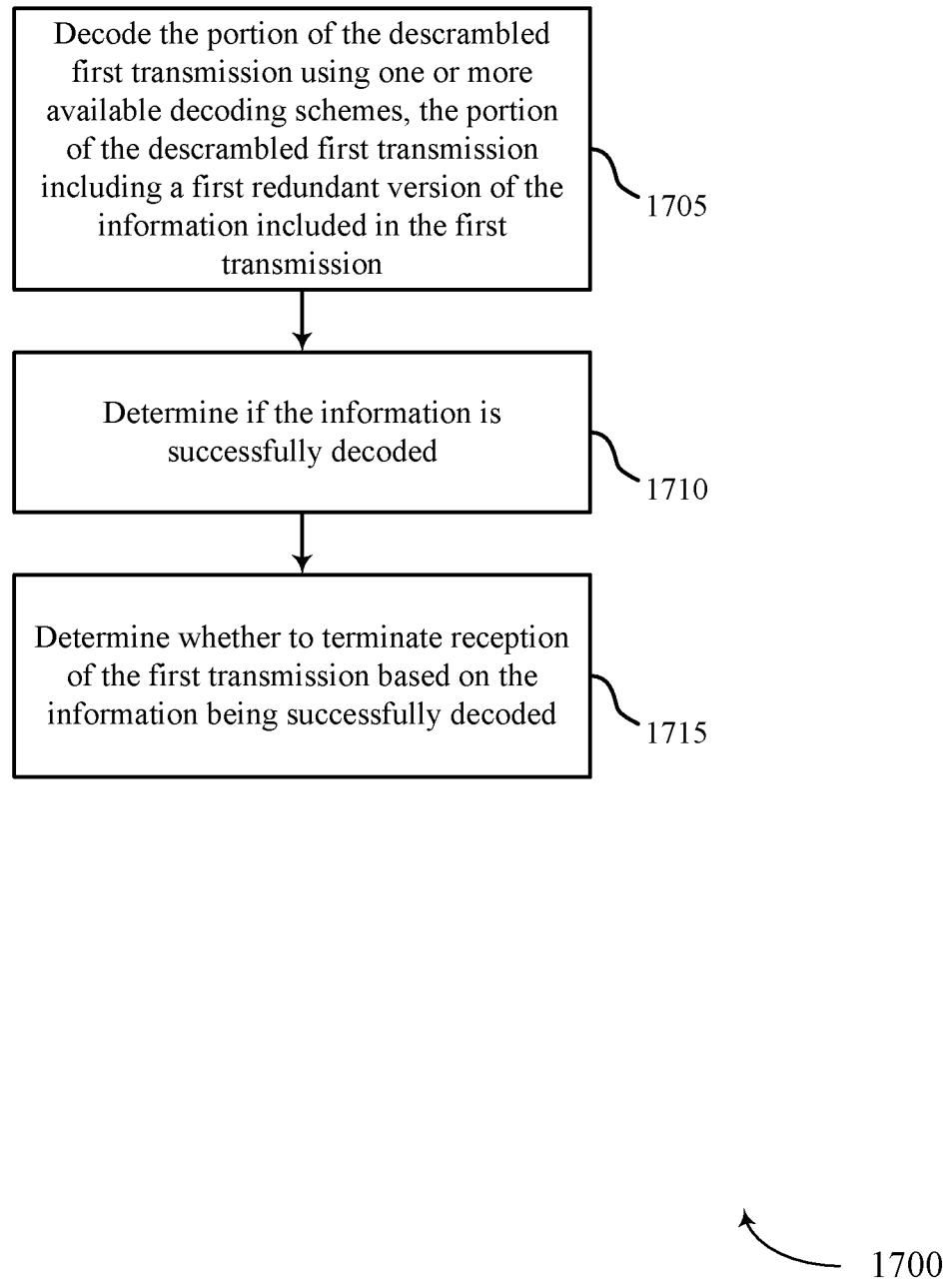

FIG. 17 shows a flowchart illustrating a method 1700 for bundle size determination and early termination in accordance with various aspects of the present disclosure. The operations of method 1700 may be implemented by a UE 115 or its components as described with reference to FIGS. 1-15. For example, the operations of method 1700 may be performed by the wireless communication manager 810 as described with reference to FIGS. 8-11. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of method 1600 of FIG. 16.

At block 1705, the UE 115 may decode a portion of a descrambled first transmission using one or more available decoding schemes, the portion of the descrambled first transmission including a first redundant version of information included in a first transmission as described with reference to FIGS. 2-7. In some examples, the operations of block 1705 may be performed by the coding module 1005 as described with reference to FIG. 10.

At block 1710, the UE 115 may determine if the information is successfully decoded as described with reference to FIGS. 2-7. In some examples, the operations of block 1710 may be performed by the coding module 1005 as described with reference to FIG. 10.

At block 1715, the UE 115 may determine whether to terminate reception of the first transmission based at least in part on the information being successfully decoded as described with reference to FIGS. 2-7. In some examples, the operations of block 1715 may be performed by the coding module 1005 as described with reference to FIG. 10.

Figure 18:
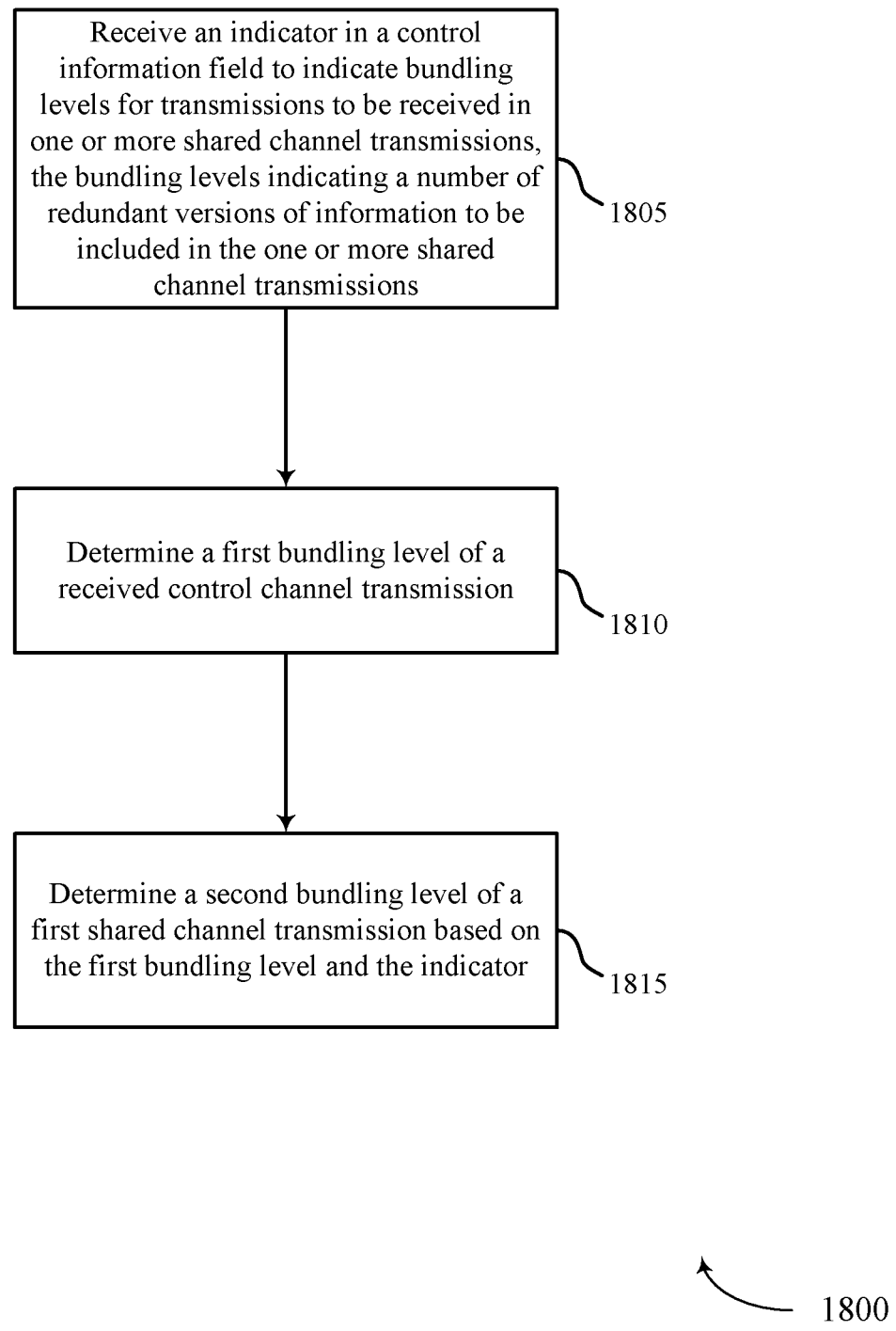

FIG. 18 shows a flowchart illustrating a method 1800 for bundle size determination for narrowband communication in accordance with various aspects of the present disclosure. The operations of method 1800 may be implemented by a UE 115 or its components as described with reference to FIGS. 1-15. For example, the operations of method 1800 may be performed by the wireless communication manager 810 as described with reference to FIGS. 8-11. In some examples, a UE 115 may execute a set of codes to control the functional elements of the UE 115 to perform the functions described below. Additionally or alternatively, the UE 115 may perform aspects the functions described below using special-purpose hardware. The method 1800 may also incorporate aspects of methods 1600, and 1700 of FIGS. 16-17.

At block 1805, the UE 115 may receive an indicator in a control information field to indicate bundling levels for transmissions to be received in one or more shared channel transmissions, the bundling levels indicating a number of redundant versions of information to be included in the one or more shared channel transmissions, as described with reference to FIGS. 2-7. In some examples, the operations of block 1805 may be performed by the signaling module 1025 as described with reference to FIG. 10.

At block 1810, the UE 115 may determine a first bundling level of a received control channel transmission as described with reference to FIGS. 2-7. In some examples, the operations of block 1810 may be performed by the coverage enhancement module 905 as described with reference to FIG. 9.

At block 1815, the UE 115 may determine a second bundling level of a first shared channel transmission based at least in part on the first bundling level and the indicator as described with reference to FIGS. 2-7. In some examples, the operations of block 1815 may be performed by the coverage enhancement module 905 as described with reference to FIG. 9.

Figure 19:
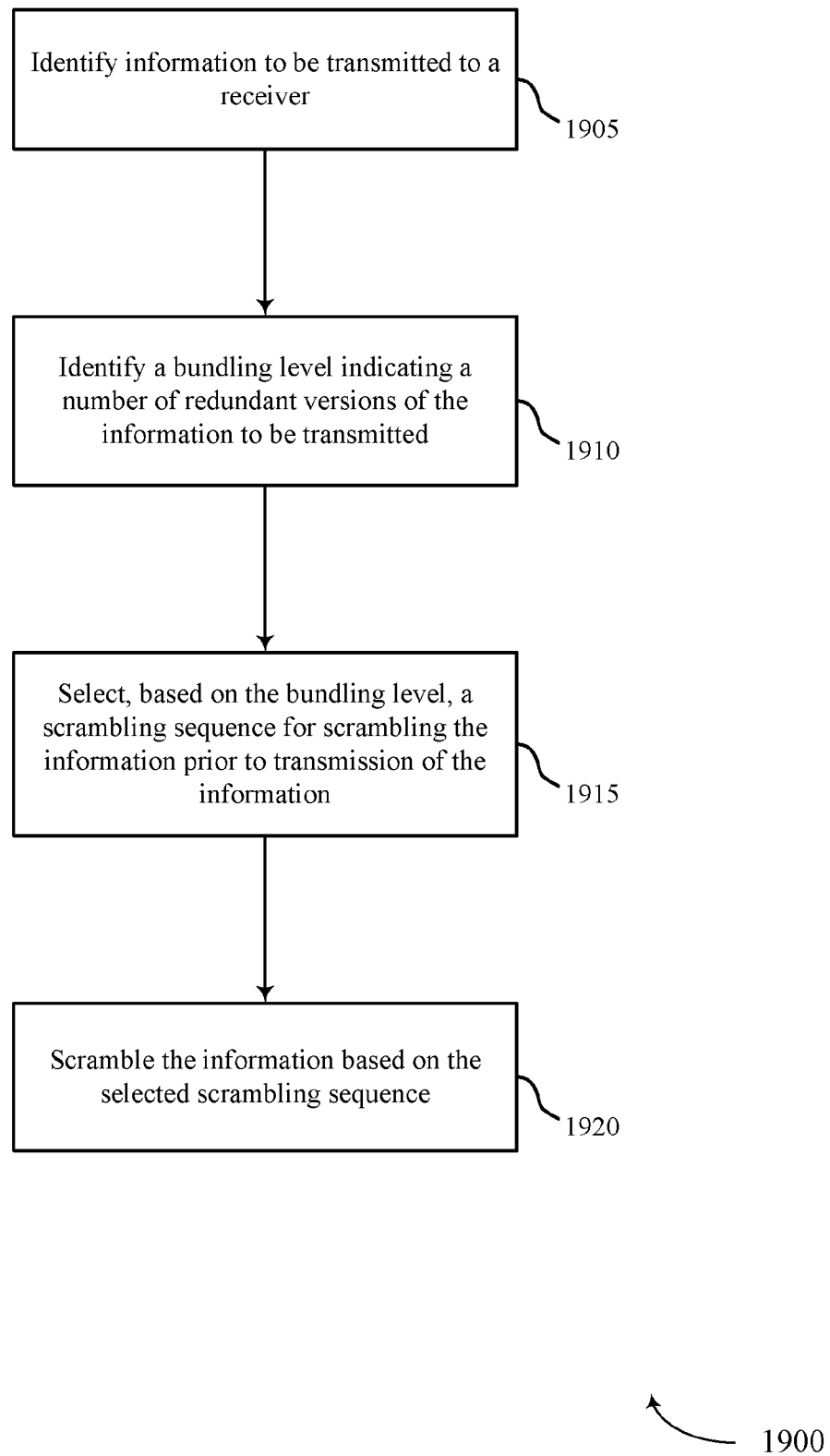

FIG. 19 shows a flowchart illustrating a method 1900 for bundle size determination for narrowband communication in accordance with various aspects of the present disclosure. The operations of method 1900 may be implemented by a base station 105 or its components as described with reference to FIGS. 1-15. For example, the operations of method 1900 may be performed by the base station wireless communication manager 1210 as described with reference to FIGS. 12-15. In some examples, a base station 105 may execute a set of codes to control the functional elements of the base station 105 to perform the functions described below. Additionally or alternatively, the base station 105 may perform aspects the functions described below using special-purpose hardware. The method 1900 may also incorporate aspects of methods 1600, 1700, and 1800 of FIGS. 16-18.

At block 1905, the base station 105 may identify information to be transmitted to a receiver as described with reference to FIGS. 2-7. In some examples, the operations of block 1905 may be performed by the BS information transmission module 1305 as described with reference to FIG. 13.

At block 1910, the base station 105 may identify a bundling level indicating a number of redundant versions of the information to be transmitted as described with reference to FIGS. 2-7. In some examples, the operations of block 1910 may be performed by the BS coverage enhancement module 1310 as described with reference to FIG. 13.

At block 1915, the base station 105 may select, based at least in part on the bundling level, a scrambling sequence for scrambling the information prior to transmission of the information as described with reference to FIGS. 2-7. In some examples, the operations of block 1915 may be performed by the BS scrambling sequence selection module 1315 as described with reference to FIG. 13.

At block 1920, the base station 105 may scramble the information based at least in part on the selected scrambling sequence as described with reference to FIGS. 2-7. In some examples, the operations of block 1920 may be performed by the BS scrambling module 1320 as described with reference to FIG. 13.

Figure 20:
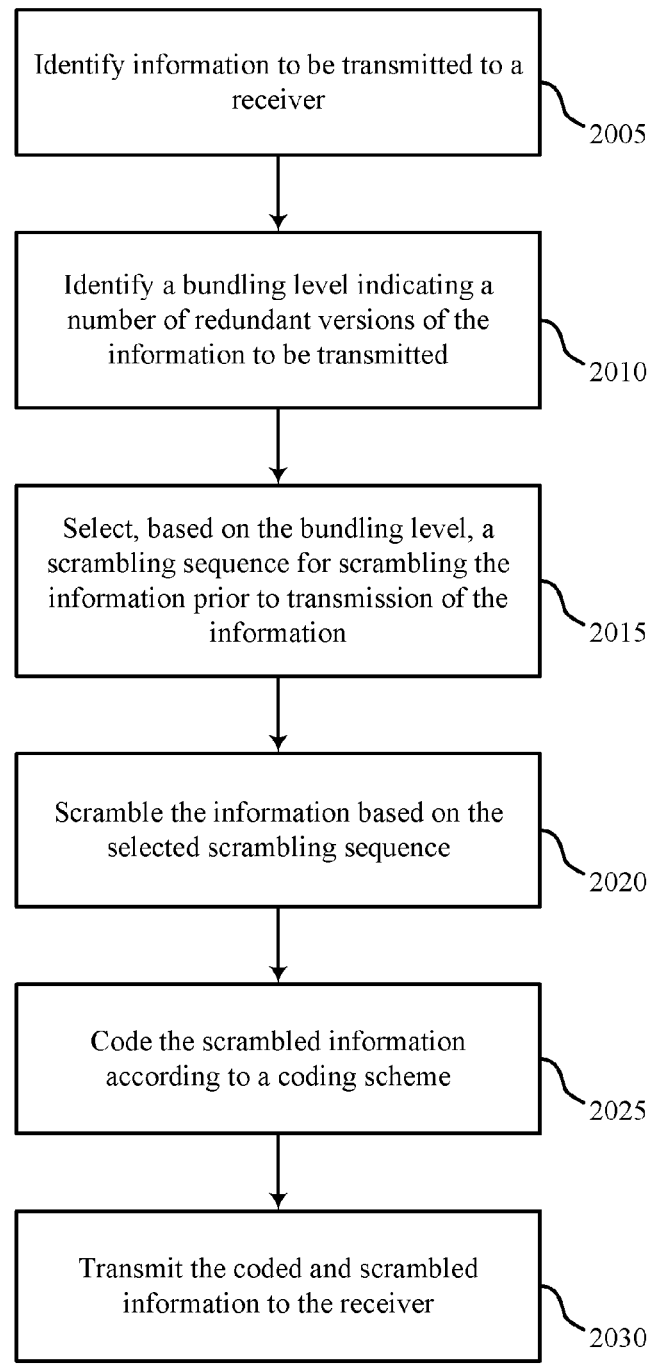

FIG. 20 shows a flowchart illustrating a method 2000 for bundle size determination for narrowband communication in accordance with various aspects of the present disclosure. The operations of method 2000 may be implemented by a base station 105 or its components as described with reference to FIGS. 1-15. For example, the operations of method 2000 may be performed by the base station wireless communication manager 1210 as described with reference to FIGS. 12-15. In some examples, a base station 105 may execute a set of codes to control the functional elements of the base station 105 to perform the functions described below. Additionally or alternatively, the base station 105 may perform aspects the functions described below using special-purpose hardware. The method 2000 may also incorporate aspects of methods 1600, 1700, 1800, and 1900 of FIGS. 16-19.

At block 2005, the base station 105 may identify information to be transmitted to a receiver as described with reference to FIGS. 2-7. In some examples, the operations of block 2005 may be performed by the BS information transmission module 1305 as described with reference to FIG. 13.

At block 2010, the base station 105 may identify a bundling level indicating a number of redundant versions of the information to be transmitted as described with reference to FIGS. 2-7. In some examples, the operations of block

2010 may be performed by the BS coverage enhancement module 1310 as described with reference to FIG. 13.

At block 2015, the base station 105 may select, based at least in part on the bundling level, a scrambling sequence for scrambling the information prior to transmission of the information as described with reference to FIGS. 2-7. In some examples, the operations of block 2015 may be performed by the BS scrambling sequence selection module 1315 as described with reference to FIG. 13.

At block 2020, the base station 105 may scramble the information based at least in part on the selected scrambling sequence as described with reference to FIGS. 2-7. In some examples, the operations of block 2020 may be performed by the BS scrambling module 1320 as described with reference to FIG. 13.

At block 2025, the base station 105 may code the scrambled information according to a coding scheme as described with reference to FIGS. 2-7. In some examples, the operations of block 2025 may be performed by the BS coding module 1405 as described with reference to FIG. 14.

At block 2030, the base station 105 may transmit the coded and scrambled information to the receiver as described with reference to FIGS. 2-7. In some examples, the operations of block 2030 may be performed by the information transmission module 1020 as described with reference to FIG. 10.

Figure 21:
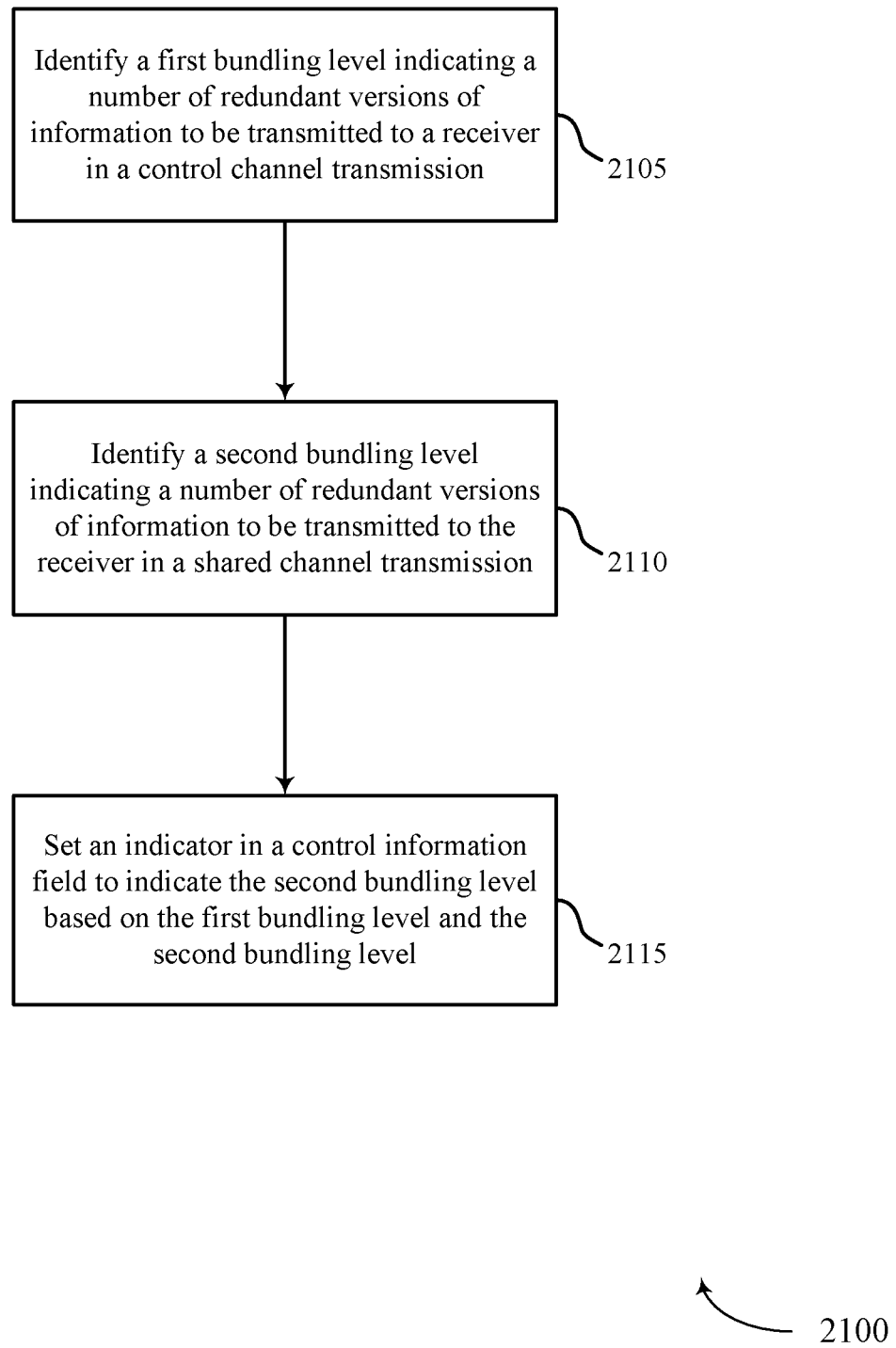
Figure 22:
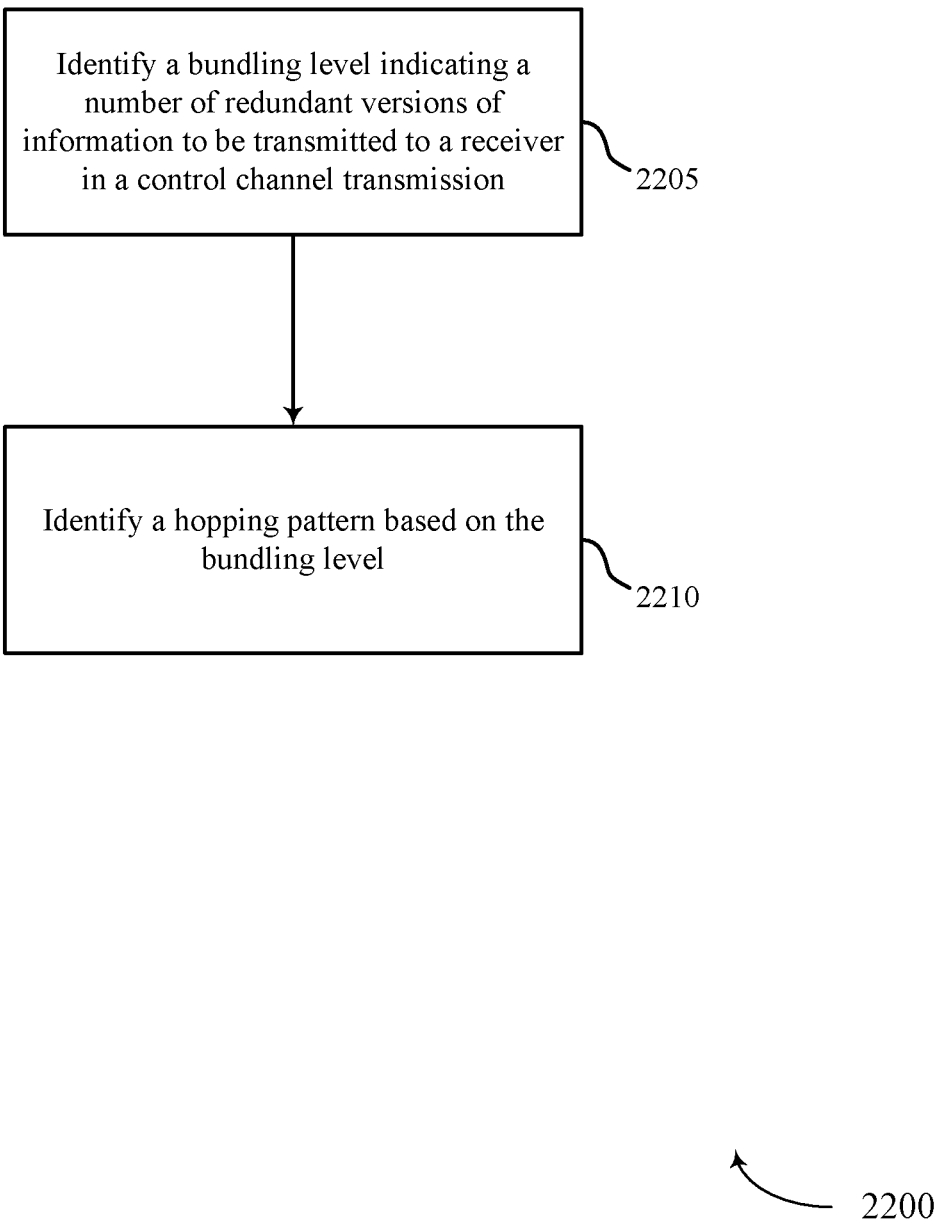

FIG. 21 shows a flowchart illustrating a method 2100 for bundle size determination for narrowband communication in accordance with various aspects of the present disclosure. The operations of method 2100 may be implemented by a base station 105 or its components as described with reference to FIGS. 1-15. For example, the operations of method 2100 may be performed by the base station wireless communication manager 1210 as described with reference to FIGS. 12-15. In some examples, a base station 105 may execute a set of codes to control the functional elements of the base station 105 to perform the functions described below. Additionally or alternatively, the base station 105 may perform aspects the functions described below using special-purpose hardware. The method 2100 may also incorporate aspects of methods 1600, 1700, 1800, 1900, and 2000 of FIGS. 16-20.

At block 2105, the base station 105 may identify a first bundling level indicating a number of redundant versions of information to be transmitted to a receiver in a control channel transmission as described with reference to FIGS. 2-7. In some examples, the operations of block 2105 may be performed by the coverage enhancement module 905 as described with reference to FIG. 9.

At block 2110, the base station 105 may identify a second bundling level indicating a number of redundant versions of information to be transmitted to the receiver in a shared channel transmission as described with reference to FIGS. 2-7. In some examples, the operations of block 2110 may be performed by the coverage enhancement module 905 as described with reference to FIG. 9.

At block 2115, the base station 105 may set an indicator in a control information field to indicate the second bundling level based at least in part on the first bundling level and the second bundling level as described with reference to FIGS. 2-7. In some examples, the operations of block 2115 may be performed by the BS signaling module 1325 as described with reference to FIG. 13.

FIG. 21 shows a flowchart illustrating a method 2100 for frequency hopping determination in accordance with various aspects of the present disclosure. The operations of method 2100 may be implemented by a UE 115 or its components as described with reference to FIGS. 1-15. For example, the operations of method 2100 may be performed by the wireless communication manager 810 as described with reference to FIGS. 8-11. In some examples, a UE 115 may execute a set of codes to control the functional elements of the UE 115 to perform the functions described below. Additionally or alternatively, the UE 115 may perform aspects the functions described below using special-purpose hardware. The method 2200 may also incorporate aspects of methods 1600, 1700, 1800, 1900, 2000, and 2100 of FIGS. 16-21.

At block 2105, the UE 115 may identify a first bundling level indicating a number of redundant versions of information to be transmitted to a receiver in a control channel transmission as described with reference to FIGS. 2-7. In some examples, the operations of block 2105 may be performed by the coverage enhancement module 905 as described with reference to FIG. 9.

At block 2110, the UE 115 may identify a hopping pattern based on the bundling level as described with reference to FIGS. 2-7. In some examples, the operations of block 2110 may be performed by the hopping module 1030 as described with reference to FIG. 10.

Thus, methods 1600, 1700, 1800, 1900, 2000, 2100, and 2200 may provide for bundle size determination for narrowband communication. It should be noted that methods 1600, 1700, 1800, 1900, 2000, 2100 and 2200 describe possible implementation, and that the operations and the steps may be rearranged or otherwise modified such that other implementations are possible. In some examples, aspects from two or more of the methods 1600, 1700, 1800, 1900, 2000, 2100, and 2200 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   identifying a first bundling level indicating a number of redundant versions of information to be transmitted to a receiver in a control channel transmission;
   identifying a second bundling level indicating a number of redundant versions of information to be transmitted to the receiver in a shared channel transmission; and
   setting an indicator in a control information field to indicate the second bundling level based at least in part on the first bundling level and the second bundling level.

2. The method of claim 1, wherein setting the indicator is further based at least in part on a mapping between the second bundling level, the first bundling level, and information contained in the indicator.

3. The method of claim 2, wherein the mapping is established in a specification for wireless communication.

4. The method of claim 2, wherein the mapping is transmitted to the receiver prior to the control channel transmission.

5. The method of claim 4, wherein the mapping is transmitted in one or more of a system information block (SIB) or radio resource control (RRC) configuration information.

6. The method of claim 2, wherein the control information field is an information field included in downlink control information (DCI) provided to the receiver.

7. The method of claim 1, further comprising:
   selecting, based at least in part on the first bundling level, a scrambling sequence for scrambling the information prior to transmission of the information; and
   scrambling the information based at least in part on the selected scrambling sequence.

8. The method of claim 7, wherein the information comprises data and a cyclic redundancy check (CRC) associated with the data, and wherein the scrambling the information comprises scrambling the cyclic redundancy check (CRC) using the selected scrambling sequence.

9. The method of claim 7, wherein the scrambling sequence is further selected based at least in part on a radio network temporary identifier (RNTI) of the receiver.

10. A method of wireless communication, comprising:
    receiving an indicator in a control information field to indicate bundling levels for transmissions to be received in one or more shared channel transmissions, the bundling levels indicating a number of redundant versions of information to be included in the one or more shared channel transmissions;
    determining a first bundling level of a received control channel transmission; and
    determining a second bundling level of a first shared channel transmission based at least in part on the first bundling level and the indicator.

11. The method of claim 10, wherein the determining the second bundling level is further based at least in part on a mapping between the second bundling level, the first bundling level, and information contained in the indicator.

12. The method of claim 11, wherein the mapping is established in a specification for wireless communication.

13. The method of claim 11, wherein the mapping is received prior to the control channel transmission.

14. The method of claim 13, wherein the mapping is received in one or more of a system information block (SIB) or radio resource control (RRC) configuration information.

15. The method of claim 10, wherein the control information field is an information field received in downlink control information (DCI) from a transmitter.

16. The method of claim 10, further comprising:
descrambling at least a portion of the received control channel transmission using a first scrambling sequence; and
determining the second bundling level used for the first shared channel transmission based at least in part on successful descrambling of at least the portion of the received control channel transmission using the first scrambling sequence.

17. The method of claim 16, wherein the information comprises data and a cyclic redundancy check (CRC) associated with the data, and wherein descrambling the portion of the first transmission comprises descrambling the CRC using the first scrambling sequence.

18. The method of claim 17, wherein the first scrambling sequence is based at least in part on a radio network temporary identifier (RNTI) of a receiver of the received transmission.

19. An apparatus for wireless communication, comprising:
a processor;
memory in electronic communication with the processor; and
instructions stored in the memory and operable, when executed by the processor, to cause the apparatus to:
identify a first bundling level indicating a number of redundant versions of information to be transmitted to a receiver in a control channel transmission;
identify a second bundling level indicating a number of redundant versions of information to be transmitted to the receiver in a shared channel transmission; and
set an indicator in a control information field to indicate the second bundling level based at least in part on the first bundling level and the second bundling level.

20. The apparatus of claim 19, wherein the instructions operable to cause the apparatus to set the indicator are further operable to cause the apparatus to set the indicator based at least in part on a mapping between the second bundling level, the first bundling level, and information contained in the indicator.

21. The apparatus of claim 20, wherein the mapping is transmitted to the receiver prior to the control channel transmission.

22. The apparatus of claim 21, wherein the mapping is transmitted in one or more of a system information block (SIB) or radio resource control (RRC) configuration information.

23. The apparatus of claim 19, wherein the instructions are operable to cause the apparatus to:
select, based at least in part on the first bundling level, a scrambling sequence for scrambling the information prior to transmission of the information; and
scramble the information based at least in part on the selected scrambling sequence.

24. The apparatus of claim 23, wherein the information comprises data and a cyclic redundancy check (CRC) associated with the data, and wherein the scrambling the information comprises scrambling the cyclic redundancy check (CRC) using the selected scrambling sequence.

25. An apparatus for wireless communication, comprising:
a processor;
memory in electronic communication with the processor; and
instructions stored in the memory and operable, when executed by the processor, to cause the apparatus to:
receive an indicator in a control information field to indicate bundling levels for transmissions to be received in one or more shared channel transmissions, the bundling levels indicating a number of redundant versions of information to be included in the one or more shared channel transmissions;
determine a first bundling level of a received control channel transmission; and
determine a second bundling level of a first shared channel transmission based at least in part on the first bundling level and the indicator.

26. The apparatus of claim 25, wherein the instructions operable to cause the apparatus to determine the second bundling level are further operable to cause the apparatus to determine the second bundling level based at least in part on a mapping between the second bundling level, the first bundling level, and information contained in the indicator.

27. The apparatus of claim 26, wherein the mapping is received prior to the control channel transmission.

28. The apparatus of claim 27, wherein the mapping is received in one or more of a system information block (SIB) or radio resource control (RRC) configuration information.

29. The apparatus of claim 25, wherein the instructions are operable to cause the apparatus to:
descramble at least a portion of the received control channel transmission using a first scrambling sequence; and
determine the second bundling level used for the first shared channel transmission based at least in part on successful descrambling of at least the portion of the received control channel transmission using the first scrambling sequence.

30. The apparatus of claim 29, wherein the information comprises data and a cyclic redundancy check (CRC) associated with the data, and wherein descrambling the portion of the first transmission comprises descrambling the CRC using the first scrambling sequence.

* * * * *